United States Patent
Abbaszadeh et al.

(10) Patent No.: US 11,146,579 B2
(45) Date of Patent: *Oct. 12, 2021

(54) HYBRID FEATURE-DRIVEN LEARNING SYSTEM FOR ABNORMALITY DETECTION AND LOCALIZATION

(71) Applicant: General Electric Company, Schenectady, NY (US)

(72) Inventors: Masoud Abbaszadeh, Clifton Park, NY (US); Fernando D'Amato, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 321 days.

This patent is subject to a terminal disclaimer.

(21) Appl. No.: 16/138,408

(22) Filed: Sep. 21, 2018

(65) Prior Publication Data
US 2020/0099707 A1    Mar. 26, 2020

(51) Int. Cl.
*H04L 29/06*    (2006.01)
*G06F 17/18*    (2006.01)
(Continued)

(52) U.S. Cl.
CPC .......... *H04L 63/1425* (2013.01); *G06F 17/18* (2013.01); *G06N 20/00* (2019.01);
(Continued)

(58) Field of Classification Search
CPC ... H04L 63/1425; H04L 63/145; H04L 63/16; H04L 63/30; G06F 17/18; G06F 15/18
(Continued)

(56) References Cited

U.S. PATENT DOCUMENTS 10,042,354 B2    8/2018    Chand et al.
10,044,749 B2    8/2018    Canedo et al.
(Continued)

FOREIGN PATENT DOCUMENTS

WO    2017171639 A1    10/2017

OTHER PUBLICATIONS

Pasqualetti, Fabio et al.,"Attack Detection and Identification in Cyber-Physical Systems", IEEE Transactions on Automatic Control, vol. 58, Issue: 11, 2013, DOI: 10.1109/TAC.2013.2266831, (pp. 2715-2729, 15 total pages).
(Continued)

*Primary Examiner* — Evans Desrosiers
(74) *Attorney, Agent, or Firm* — Buckley, Maschoff & Talwalkar LLC

(57) ABSTRACT

A cyber-physical system may have a plurality of monitoring nodes each generating a series of current monitoring node values over time representing current operation of the system. A data-driven features extraction computer platform may receive the series of current monitoring node values and generate current data-driven feature vectors based on the series of current monitoring node values. A residual features extraction computer platform may receive the series of current monitoring node values, execute a system model and utilize a stochastic filter to determine current residual values, and generate current residual-driven feature vectors based on the current residual values. An abnormal detection platform may then receive the current data-driven and residual-driven feature vectors and compare the current data-driven and residual-driven feature vectors with at least one decision boundary associated with an abnormal detection model. An abnormal alert signal may then be transmitted when appropriate based on a result of said comparison.

21 Claims, 21 Drawing Sheets

(51) Int. Cl.
*H04L 12/26* (2006.01)
*G06N 20/00* (2019.01)

(52) U.S. Cl.
CPC ............ *H04L 43/16* (2013.01); *H04L 63/145* (2013.01); *H04L 63/20* (2013.01)

(58) Field of Classification Search
USPC .......................................................... 726/22
See application file for complete search history.

(56) References Cited

U.S. PATENT DOCUMENTS

| | | |
|---|---|---|
| 2005/0265233 A1* | 12/2005 | Johnson ................ H04L 63/145 370/229 |
| 2015/0346706 A1 | 12/2015 | Gendelman |
| 2016/0328654 A1* | 11/2016 | Bauer ................... G06K 9/6267 |
| 2017/0230410 A1 | 8/2017 | Hassanzadeh et al. |
| 2017/0359366 A1 | 12/2017 | Bushey et al. |
| 2018/0082058 A1 | 3/2018 | Ferragut et al. |
| 2018/0157831 A1 | 6/2018 | Abbaszadeh et al. |
| 2018/0276375 A1* | 9/2018 | Arov ................... G05B 19/4185 |

OTHER PUBLICATIONS

Yan, Weizhong et al.,"On Accurate and Reliable Anomaly Detection for Gas Turbine Combustors: A Deep Learning Approach", Annual Conference of The Prognostics and Health Management Society, 2015, (pp. 1-8, 8 total pages).

\* cited by examiner

HYBRID FEATURE-DRIVEN LEARNING SYSTEM FOR ABNORMALITY DETECTION AND LOCALIZATION

This invention was made with government support under Contract DE-OE0000902 awarded by the US Department of Energy. The government has certain rights in the invention.

BACKGROUND

Industrial control systems that operate physical systems (e.g., associated with power turbines, jet engines, locomotives, autonomous vehicles, etc.) are increasingly connected to the Internet. As a result, these control systems have been increasingly vulnerable to threats, such as cyber-attacks (e.g., associated with a computer virus, malicious software, etc.) that could disrupt electric power generation and distribution, damage engines, inflict vehicle malfunctions, etc. Current methods primarily consider attack detection in Information Technology ("IT," such as, computers that store, retrieve, transmit, manipulate data) and Operation Technology ("OT," such as direct monitoring devices and communication bus interfaces). Cyber-attacks can still penetrate through these protection layers and reach the physical "domain" as seen in 2010 with the Stuxnet attack. Such attacks can diminish the performance of a control system and may cause total shut down or even catastrophic damage to a plant. Currently, no methods are available to automatically detect, during a cyber-incident, attacks at the domain layer where sensors, controllers, and actuators are located. In some cases, multiple attacks may occur simultaneously (e.g., more than one actuator, sensor, or parameter inside control system devices might be altered maliciously by an unauthorized party at the same time). Note that some subtle consequences of cyber-attacks, such as stealthy attacks occurring at the domain layer, might not be readily detectable (e.g., when only one monitoring node, such as a sensor node, is used in a detection algorithm). It may also be important to determine when a monitoring node is experiencing a fault (as opposed to a malicious attack) and, in some cases, exactly what type of fault is occurring. Existing approaches to protect an industrial control system, such as failure and diagnostics technologies, may not adequately address these problems—especially when multiple, simultaneous attacks and/faults occur since such multiple faults/failure diagnostic technologies are not designed for detecting stealthy attacks in an automatic manner.

In some cases, a Fault Detection and Isolation ("FDI") approach may be taken to detect abnormal operation of a cyber-physical system. There is a large body of research using such model-based and observer-based techniques any many existing systems already employ some level of FDI protection. Note, however, that these techniques often require selection of one or more threshold values for residual information (e.g., differences between expected values predicted by a model and currently observed values). Traditionally, the thresholds for a residual-based anomaly decision are set using statistical hypothesis testing methods (e.g., a X-square test). These methods have been proven to result in high false positive rates and high false negative rates in the presence of cyber-attack. As a result, they may be unsuitable for cyber-attack detection applications.

It would therefore be desirable to protect a cyber-physical system from cyber-attacks and other abnormal operation in an automatic and accurate manner even when attacks percolate through the IT and OT layers and directly harm control systems.

SUMMARY

According to some embodiments, monitoring nodes may generate a series of current monitoring node values over time representing current operation of a cyber-physical system. A data-driven features extraction computer platform may receive the series of current monitoring node values and generate current data-driven feature vectors based on the series of current monitoring node values. A residual features extraction computer platform may receive the series of current monitoring node values, execute a system model and utilize a stochastic filter to determine current residual values, and generate current residual-driven feature vectors based on the current residual values. An abnormal detection platform may then receive the current data-driven and residual-driven feature vectors and compare the current data-driven and residual-driven feature vectors with at least one decision boundary associated with an abnormal detection model. An abnormal alert signal may then be transmitted when appropriate based on a result of said comparison.

Some embodiments comprise: means for receiving, by a data-driven features extraction computer platform, the series of current monitoring node values; means for determining, by the data-driven features extraction computer platform, current data-driven feature vectors based on the series of current monitoring node values; means for receiving, by a residual features extraction computer platform, the series of current monitoring node values; means for executing, by the residual features extraction computer platform, a system model and utilize a stochastic filter to generate current residual values; means for determining, by the residual features extraction computer platform, current residual-driven feature vectors based on the current residual values; means for receiving the current data-driven and residual-driven feature vectors at an abnormal detection platform; means for comparing, by the abnormal detection platform, the current data-driven and residual-driven feature vectors with at least one decision boundary associated with an abnormal detection model; and means for transmitting, by the abnormal detection platform, an abnormal alert signal based on a result of said comparison.

Some technical advantages of some embodiments disclosed herein are improved systems and methods to protect one or more cyber-physical systems from abnormalities, such as cyber-attacks, in an automatic and accurate manner.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
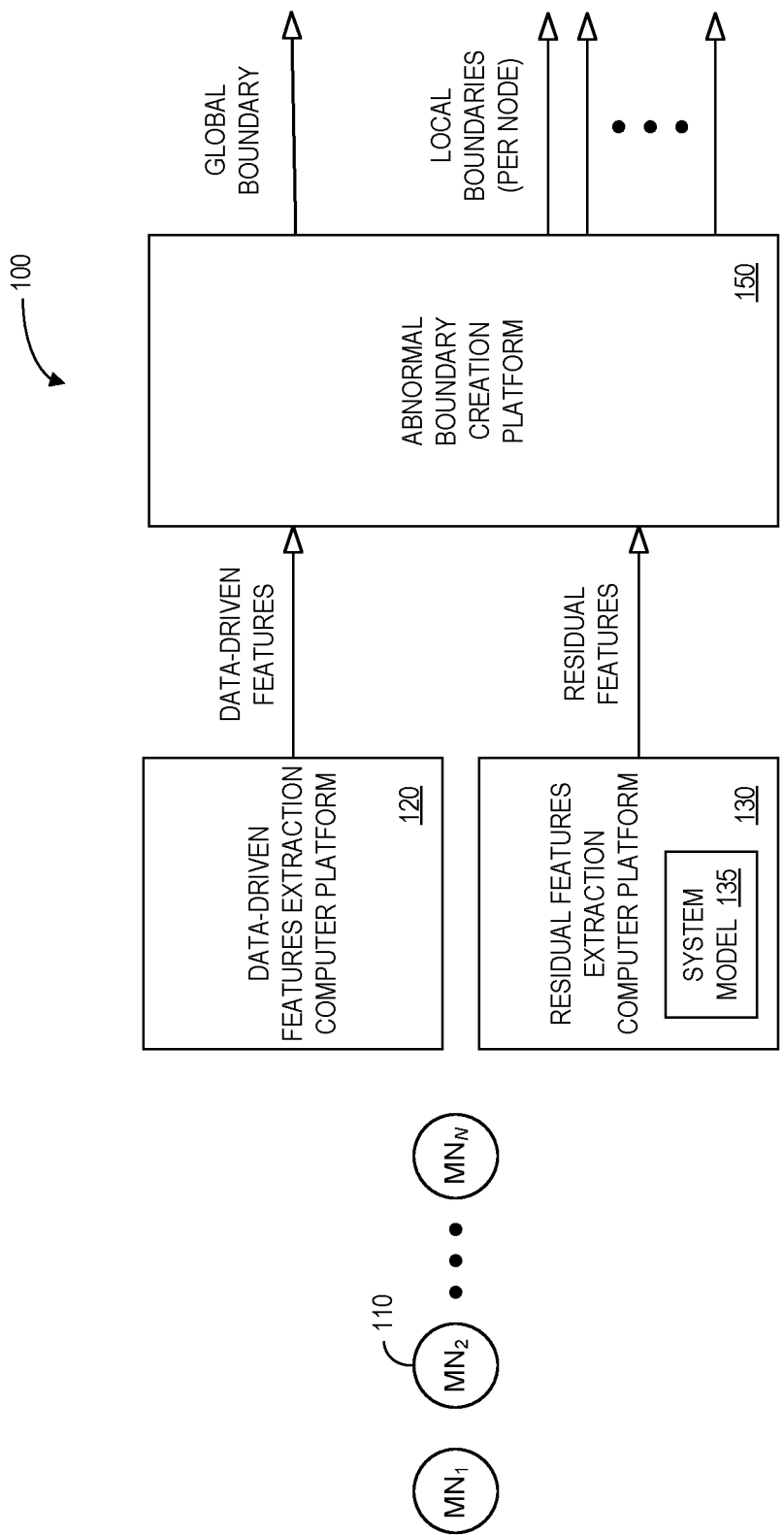
FIG. 1 is a high-level block diagram of a system that may be provided in accordance with some embodiments.

FIG. 1 is a high-level block diagram of a system 100 that may be provided in accordance with some embodiments. The system 100 includes monitoring nodes 110, such as sensors, actuators, etc., that generate a series of current monitoring node values over time that represent a current operation of a cyber-physical system (e.g., an industrial asset). As described with respect to FIGS. 3 through 14, the system 100 may create global and local feature vector decision boundaries that can then be used to classify operation as "normal," "abnormal," "failed," etc. The system 100 includes a data-driven features extraction computer platform 120 that receives information from the monitoring nodes 110 and generates data-driven features. The system 100 also includes a residual features extraction computer platform 120 that receives information from the monitoring nodes 110 and generates residual features. An abnormal boundary creation platform 150 receives the data-driven features and residual features and outputs one or more global boundaries (e.g., associated with data-based and residual-based feature vectors) and local boundaries for various monitoring nodes (e.g., each being associated with data-based and residual-based feature vectors).

Figure 2:
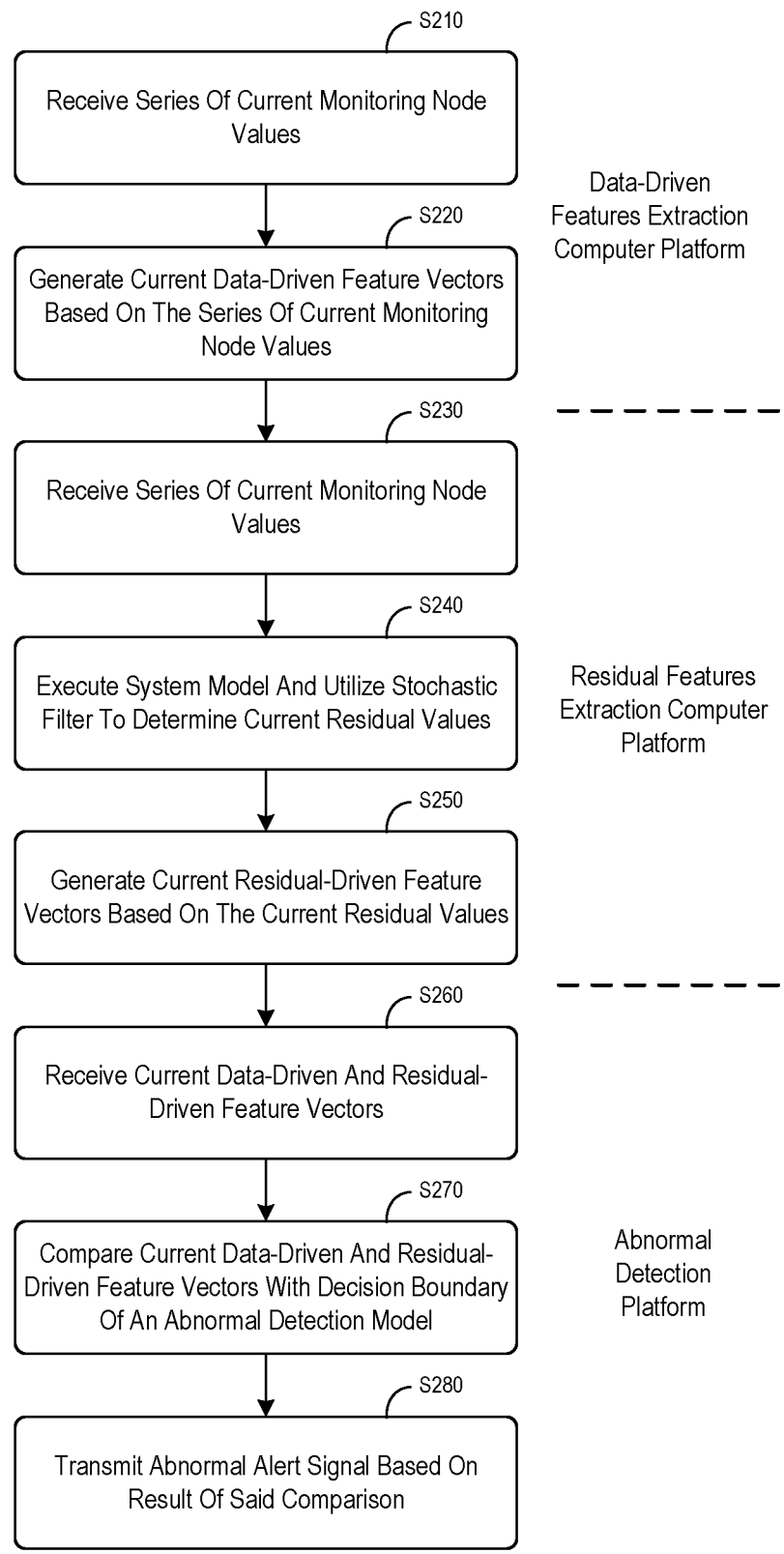
FIG. 2 is a method that may be provided in accordance with some embodiments.

The boundaries can then be used to implement abnormality detection for a cyber-physical system. For example, FIG. 2 is a method that may be provided in accordance with some embodiments. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, the data-driven features extraction computer platform may receive a series of current monitoring node values. At S220, the data-driven features extraction computer platform may generate current data-driven feature vectors based on the series of current monitoring node values.

While steps S210 and S220 are performed by a data-driven feature extraction platform, the following three steps (S230, S240, S250) may be performed by a residual features extraction computer platform (e.g., simultaneously while steps S210 and S220 are performed by the data-driven feature extraction platform. At S230, the residual features extraction computer platform may receive the series of current monitoring node values. At S240, the residual features extraction computer platform may execute a system model and utilize a stochastic filter to generate current residual values. Note that the system model might be associated with a Linear Time Invariant ("LTI") form, a Linear Time Varying ("LTV") form, a Linear Parameter Varying ("LPV") form, or a non-linear form. Moreover, the stochastic filter might be associated with at a Kalman Filter ("KF"), an Extended Kalman Filter ("EKF"), or an Unscented Kalman Filter ("UKF"). At S250, the residual features extraction computer platform may generate current residual-driven feature vectors based on the current residual values.

The next three steps (S260, S270, S280) may be performed by an abnormal detection platform using the decision boundaries created as described with respect to FIG. 1. At S260, the abnormal detection platform may receive the current data-driven and residual-driven feature vectors. Note that the current data-driven and residual-driven feature vectors may, according to some embodiments, undergo a feature augmentation process prior to being received by the abnormal detection platform. At S270, the abnormal detection platform may compare the current data-driven and residual-driven feature vectors with at least one decision boundary associated with an abnormal detection model. At S280, the abnormal detection platform may transmit an abnormal alert signal based on a result of said comparison. For example, when a boundary is crossed, the abnormal alert signal might transmit a warning to an operator or administrator, trigger initiation of localization or mitigation procedures, etc.

Figure 14:
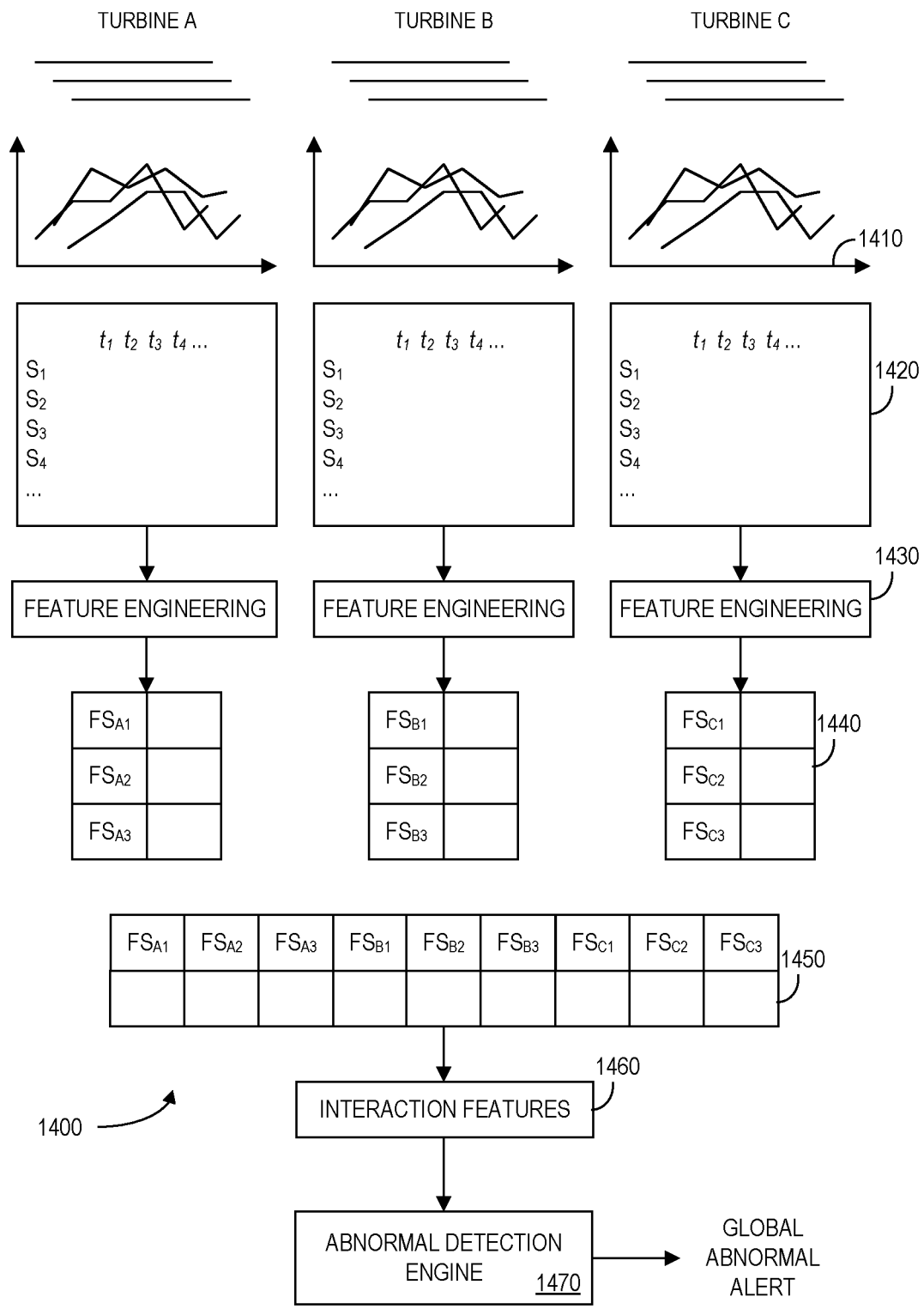
FIG. 14 is an example of a global abnormality protection system in accordance with some embodiments when multiple gas turbines are involved in a system.

Note that at least one decision boundary and abnormal alert signal may be associated with "global" feature vectors (e.g., associated with the entire cyber-physical system as described with respect to FIG. 14). According to some embodiments, sub-sets of the current data-driven feature vectors, current residual-driven feature vectors, and decision boundaries may be associated with "local" feature vectors (e.g., each associated with one monitoring node or component of the cyber-physical system).

Figure 3:
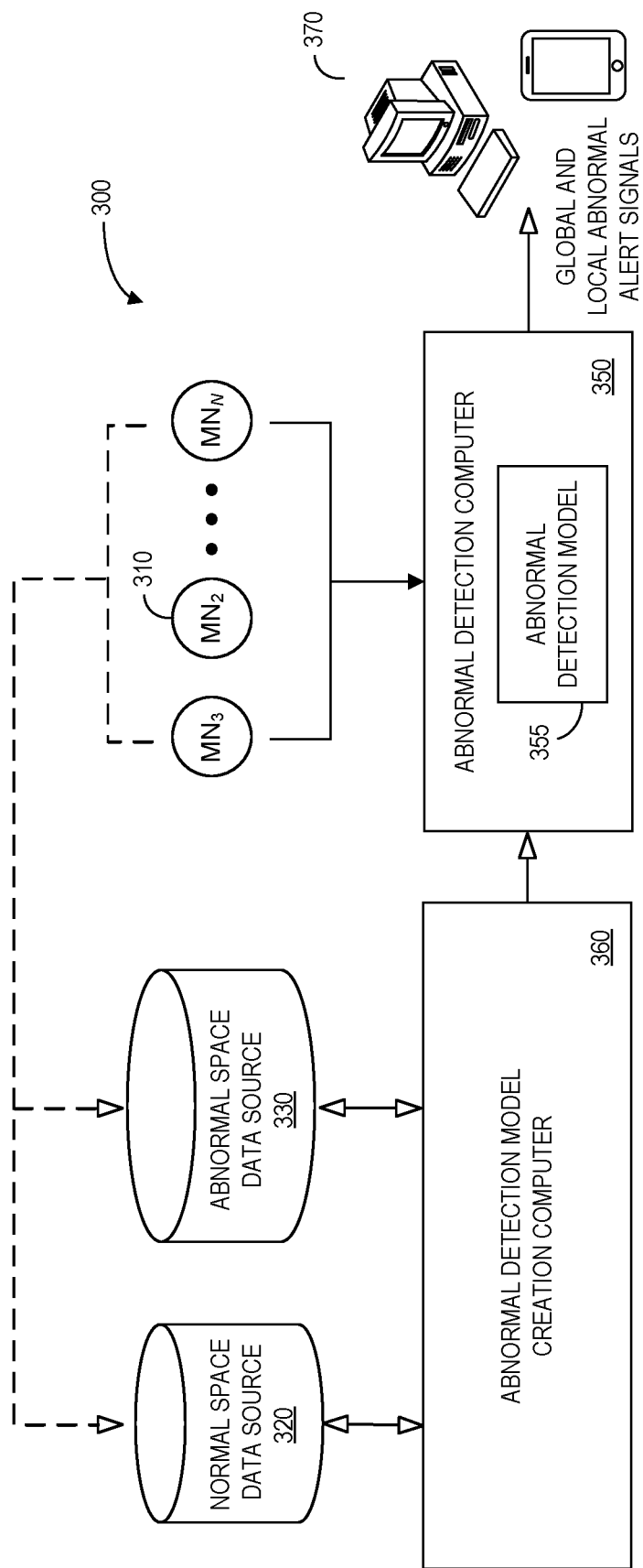
FIG. 3 is a high-level block diagram of a system that may be provided in accordance with some embodiments.

FIG. 3 is a high-level architecture of a system 300 in accordance with some embodiments. The system 300 may include monitoring node sensors 310 $MN_1$ through $MN_N$, a "normal space" data source 320, and an "abnormal space" data source 330. The normal space data source 320 might store, for each of the plurality of monitoring nodes 310, a series of normal values over time that represent normal operation of a cyber-physical system (e.g., generated by a model or collected from actual sensor data as illustrated by the dashed line in FIG. 3). The abnormal space data source 330 might store, for each of the monitoring nodes 310, a series of abnormal values that represent abnormal operation of the cyber-physical system (e.g., when the system is experiencing a cyber-attack or a fault).

Information from the normal space data source 320 and the abnormal space data source 330 may be provided to an abnormal detection model creation computer 360 that uses this data to create a decision boundary (that is, a boundary that separates normal behavior from threatened behavior). The decision boundary may then be used by an abnormal detection computer 350 executing an abnormal detection model 355. The abnormal detection model 355 may, for example, monitor streams of data from the monitoring nodes 310 comprising data from sensor nodes, actuator nodes, and/or any other critical monitoring nodes (e.g., sensor nodes $MN_1$ through $MN_N$) and automatically output global and local abnormal alert signal to one or more remote monitoring devices 370 when appropriate (e.g., for display to an operator or to have the global and local information fused in accordance with any of the embodiments described herein). As used herein, the term "automatically" may refer to, for example, actions that can be performed with little or no human intervention. According to some embodiments, information about detected threats may be transmitted back to a cyber-physical system control system. Note that, according to some embodiments, the abnormal detection computer 350 may implement a hybrid approach that also incorporates residuals (and residual features) when making an abnormality classification (e.g., as described with respect to FIGS. 15 and 16).

As used herein, devices, including those associated with the system 300 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The abnormal detection model creation computer 360 may store information into and/or retrieve information from various data stores, such as the normal space data source 320 and/or the abnormal space data source 330. The various data sources may be locally stored or reside remote from the abnormal detection model creation computer 360. Although a single abnormal detection model creation computer 360 is shown in FIG. 3, any number of such devices may be included. Moreover, various devices described herein might be combined according to embodiments of the present invention. For example, in some embodiments, the abnormal detection model creation computer 360 and one or more data sources 320, 330 might comprise a single apparatus. The abnormal detection model creation computer 360 functions may be performed by a constellation of networked apparatuses, in a distributed processing or cloud-based architecture.

A user may access the system 300 via one of the monitoring devices 370 (e.g., a Personal Computer ("PC"), tablet, or smartphone) to view information about and/or manage threat information in accordance with any of the embodiments described herein. In some cases, an interactive graphical display interface may let a user define and/or adjust certain parameters (e.g., abnormal detection trigger levels) and/or provide or receive automatically generated recommendations or results from the abnormal detection model creation computer 360 and/or abnormal detection computer 350.

Thus, some embodiments described herein may use time series data from one or more monitoring nodes 310 from a physical (i.e., industrial or enterprise) asset and provide a reliable abnormality detection with low false positive rate. The system may extract features from the time series data for each monitoring node. The term "feature" may refer to, for example, mathematical characterizations of data. Examples of features as applied to data might include the maximum and minimum, mean, standard deviation, variance, settling time, Fast Fourier Transform ("FFT") spectral components, linear and non-linear principal components, independent components, sparse coding, deep learning, etc. The type and number of features for each monitoring node might be optimized using domain-knowledge and/or a feature discovery process. The features may be, for example, calculated over a sliding window with consecutive samples of specified duration from time series data. The length of the window and the duration of overlap for each batch may be determined from domain knowledge and an inspection of the data or using batch processing. Note that features may be computed at the local level (associated with each monitoring node) and the global level (associated with all the monitoring nodes, i.e., the whole asset). The time-domain values of the nodes or their extracted features may be, according to some embodiments, normalized for better numerical conditioning.

Figure 4:
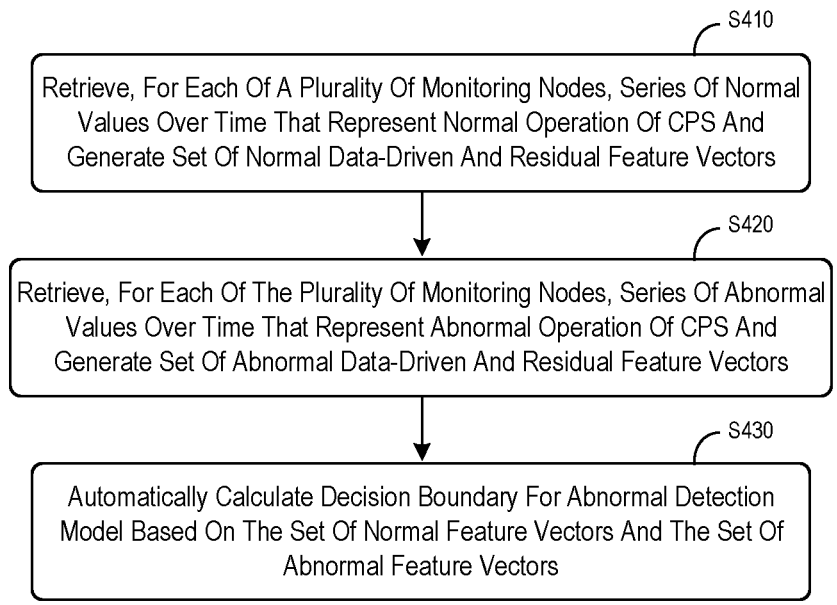
FIG. 4 is a model creation method according to some embodiments.

FIG. 4 illustrates a model creation method that might be performed by some or all of the elements of the system 300 described with respect to FIG. 3. At S410, the system may retrieve, for each of a plurality of monitoring nodes (e.g., sensor nodes, ac, controller nodes, etc.), a series of normal values over time that represent normal operation of the Cyber-Physical System ("CPS") and a set of normal data-driven and residual feature vectors may be generated. Similarly, at S420 the system may retrieve, for each of the plurality of monitoring nodes, a series of abnormal (e.g., attacked) values over time that represent an abnormal operation of the cyber-physical system and a set of abnormal data-driven and residual feature vectors may be generated. The series of normal and/or abnormal values might be obtained, for example, by running Design of Experiments ("DoE") on a cyber-physical system. At S430, a decision boundary may be automatically calculated for an abnormal detection model based on the set of normal feature vectors and the set of abnormal feature vectors (including both data-driven and residual feature vectors). According to some embodiments, the decision boundary might be associated with a line, a hyperplane, a non-linear boundary separating normal space from threatened space, and/or a plurality of decision boundaries. Moreover, a decision boundary might comprise a multi-class decision boundary separating normal space, attacked space, and degraded operation space (e.g., when a sensor fault occurs). In addition, note that the abnormal detection model might be associated with the decision boundary, feature mapping functions, and/or feature parameters.

Figure 5:
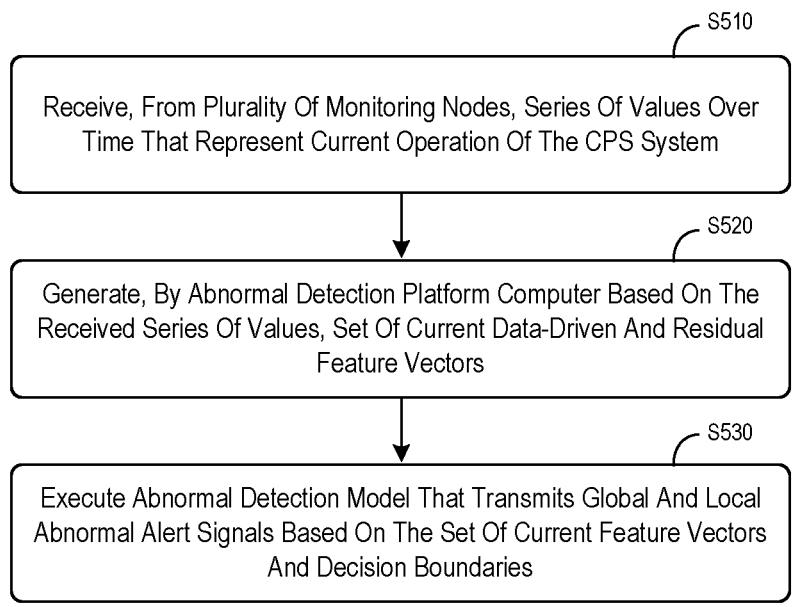
FIG. 5 is an abnormal alert method according to some embodiments.

The decision boundary can then be used to detect abnormal operation (e.g., as might occur during cyber-attacks). For example, FIG. 5 is an abnormal alert method according to some embodiments. At S510, the system may receive, from a plurality of monitoring nodes, a series of current values over time that represent a current operation of the cyber-physical system. At S520, an attack detection platform computer may then generate, based on the received series of current values, a set of current data-driven and residual feature vectors. At S530, an abnormal detection model may be executed to transmit an abnormal alert signal based on the set of current feature vectors and a decision boundary when appropriate (e.g., when a cyber-attack or fault is detected). According to some embodiments, one or more response actions may be performed when an abnormal alert signal is transmitted. For example, the system might automatically shut down all or a portion of the cyber-physical system (e.g., to let the detected potential cyber-attack be further investigated). As other examples, one or more parameters might be automatically modified, a software application might be automatically triggered to capture data and/or isolate possible causes, etc.

Some embodiments described herein may take advantage of the physics of a control system by learning a priori from tuned high-fidelity equipment models and/or actual "on the job" data to detect single or multiple simultaneous adversarial threats to the system. Moreover, according to some embodiments, all monitoring node data may be converted to features using advanced feature-based methods, and the real-time operation of the control system may be monitored in substantially real-time. Abnormalities may be detected by classifying the monitored data as being "normal" or disrupted (or degraded). This decision boundary may be constructed using dynamic models and may help enable early detection of vulnerabilities (and potentially avert catastrophic failures) allowing an operator to restore the control system to normal operation in a timely fashion.

Note that an appropriate set of multi-dimensional feature vectors, which may be extracted automatically (e.g., via an algorithm) and/or be manually input, might comprise a good predictor of measured data in a low dimensional vector space. According to some embodiments, appropriate decision boundaries may be constructed in a multi-dimensional space using a data set which is obtained via scientific principles associated with DoE techniques. Moreover, multiple algorithmic methods (e.g., support vector machines or machine learning techniques) may be used to generate decision boundaries. Since boundaries may be driven by measured data (or data generated from high-fidelity models), defined boundary margins may help to create an abnormal zone in a multi-dimensional feature space. Moreover, the margins may be dynamic in nature and adapted based on a transient or steady state model of the equipment and/or be obtained while operating the system as in self-learning systems from incoming data stream. According to some embodiments, a training method may be used for supervised learning to teach decision boundaries. This type of supervised learning may take into account on operator's knowledge about system operation (e.g., the differences between normal and abnormal operation).

Figure 6:
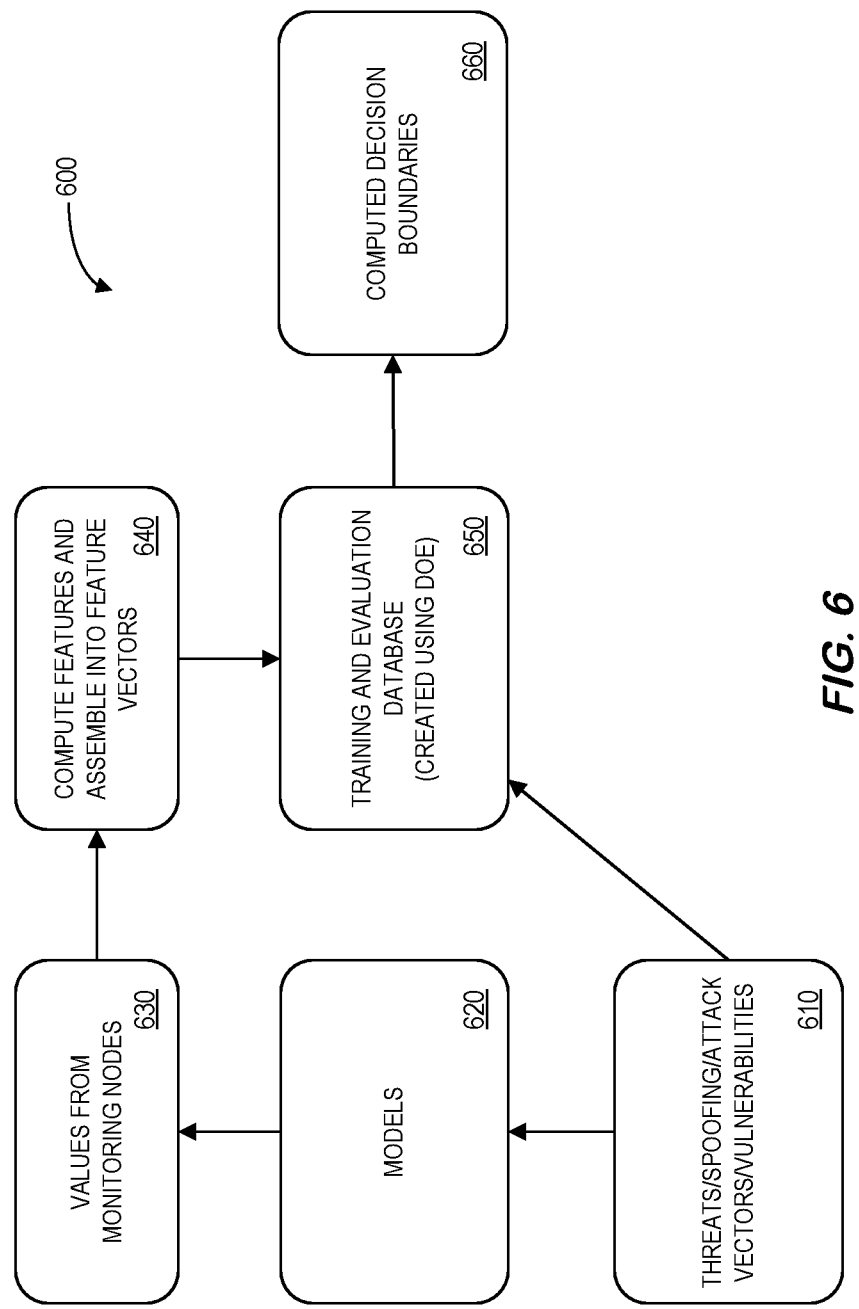
FIG. 6 illustrates an off-line process in accordance with some embodiments.

FIG. 6 illustrates an off-line boundary creation process 600 in accordance with some embodiments. Information about threats, spoofing, attack vectors, vulnerabilities, etc. 610 may be provided to models 620 and/or a training and evaluation database 650 created using DoE techniques. The models 620 may, for example, simulate data 630 from monitoring nodes to be used to compute features that are assembled into a feature vector 640 to be stored in the training and evaluation database 650. The data in the training and evaluation database 650 may then be used to compute decision boundaries 660 to distinguish between normal operation and abnormal operation. According to some embodiments, the process 600 may include a prioritization of monitoring nodes and anticipated attack vectors to form one or more data sets to develop decision boundaries. Attack vectors are abnormal values at critical inputs where malicious attacks can be created at the domain level that will make the system go into threatened/abnormal space. In addition, the models 620 may comprise high-fidelity models that can be used to create a data set (e.g., a set that describes threat space as "levels of threat conditions in the system versus quantities from the monitoring nodes"). The data 630 from the monitoring nodes might be, for example, quantities that are captured for a length of from 60 to 80 seconds from sensor nodes, actuator nodes, and/or controller nodes (and a similar data set may be obtained for "levels of normal operating conditions in the system versus quantities from the monitoring nodes"). This process will result in data sets for "abnormal space" and "normal space." The 60 to 80 seconds long quantities may be used to compute features 640 using feature engineering to create feature vectors. These feature vectors (along with residual features, according to some embodiments) can then be used to obtain a decision boundary that separates the data sets for abnormal space and normal space (used to detect an anomaly such as a cyber-attack or naturally occurring fault).

Since attacks might be multi-prong (e.g., multiple attacks might happen at once), DoE experiments may be designed to capture the attack space (e.g., using full factorial, Taguchi screening, central composite, and/or Box-Behnken). When models are not available, these DoE methods can also be used to collect data from real-world asset control system. Experiments may run, for example, using different combinations of simultaneous attacks. Similar experiments may be run to create a data set for the normal operating space. According to some embodiments, the system may detect "degraded" or faulty operation as opposed to a threat or attack. Such decisions may require the use of a data set for a degraded and/or faulty operating space.

Figure 7:
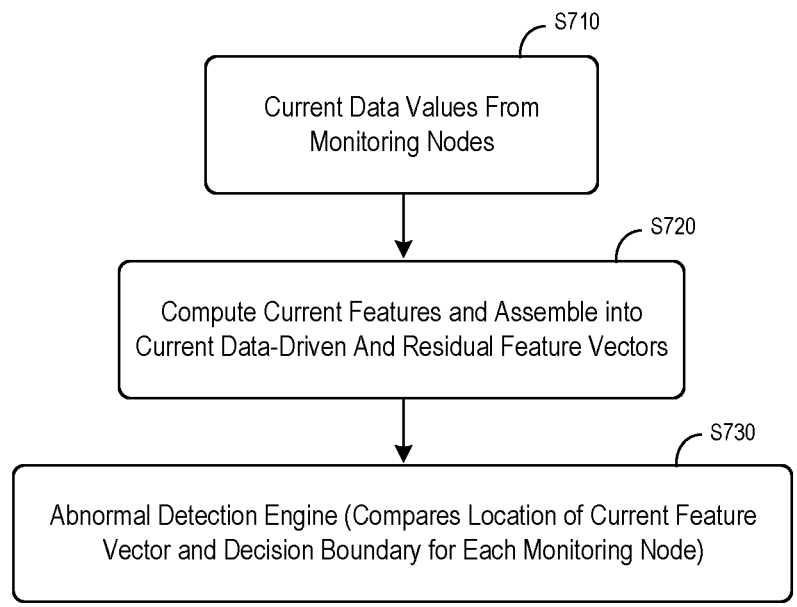
FIG. 7 illustrates a real-time process according to some embodiments.

FIG. 7 illustrates a real-time process to protect a cyber-physical system according to some embodiments. At S710, current data from monitoring nodes may be gathered (e.g., in batches of from 60 to 80 seconds). At S720, the system may compute features and form data-driven and residual feature vectors. For example, the system might use weights from a principal component analysis as features. At S730, an abnormal detection engine may compare location of feature vectors to a decision boundary to make a determination (and output an abnormal signal if necessary). According to some embodiments, monitoring node data from models (or from real systems) may be expressed in terms of features since features are a high-level representation of domain knowledge and can be intuitively explained. Moreover, embodiments may handle multiple features represented as vectors and interactions between multiple sensed quantities might be expressed in terms of "interaction features."

Note that many different types of features may be utilized in accordance with any of the embodiments described herein, including principal components (weights constructed with natural basis sets) and statistical features (e.g., mean, variance, skewness, kurtosis, maximum, minimum values of time series signals, location of maximum and minimum values, independent components, etc.). Other examples include deep learning features (e.g., generated by mining experimental and/or historical data sets) and frequency domain features (e.g., associated with coefficients of Fourier or wavelet transforms). Embodiments may also be associated with time series analysis features, such as cross-correlations, auto-correlations, orders of the autoregressive, moving average model, parameters of the model, derivatives and integrals of signals, rise time, settling time, neural networks, etc. Still other examples include logical features (with semantic abstractions such as "yes" and "no"), geographic/position locations, and interaction features (mathematical combinations of signals from multiple monitoring nodes and specific locations). Embodiments may incorporate any number of features, with more features allowing the approach to become more accurate as the system learns more about the physical process and threat. According to some embodiments, dissimilar values from monitoring nodes may be normalized to unit-less space, which may allow for a simple way to compare outputs and strength of outputs.

Figure 8:
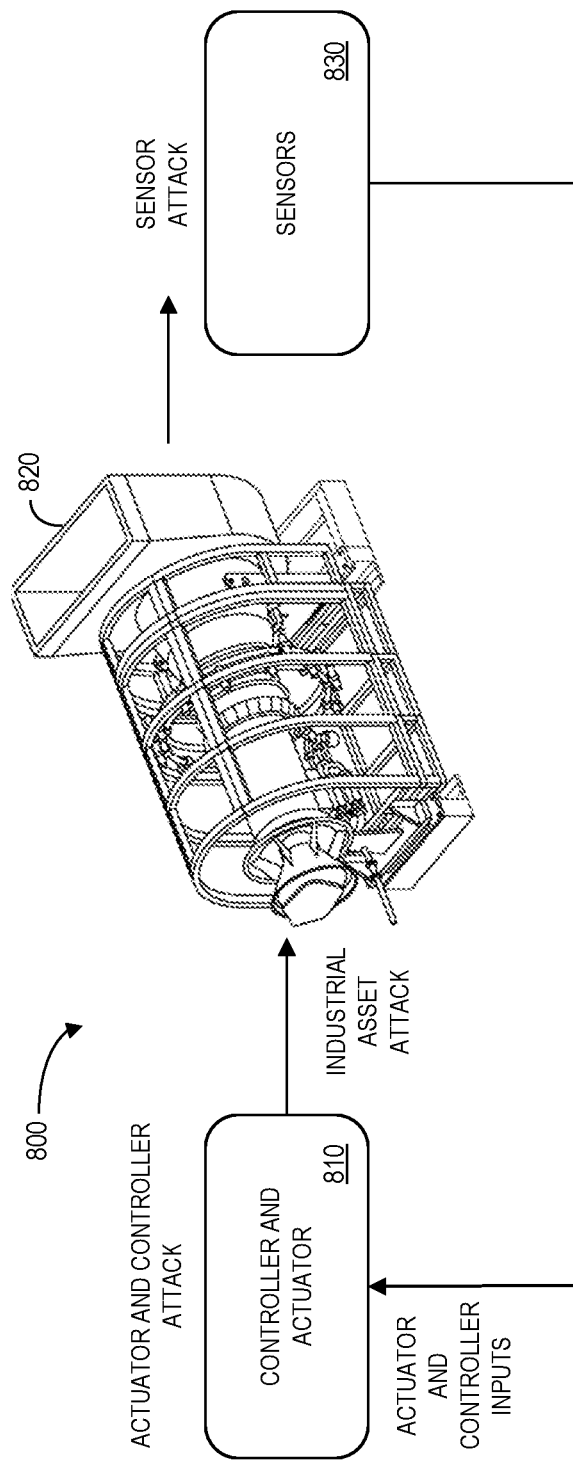
FIG. 8 is an example associated with a cyber-physical system engine in accordance with some embodiments.

FIG. 8 is an example 800 associated with a cyber-physical system in accordance with some embodiments. In particular, the example includes a controller and actuator portion 810 subject to actuator and controller attacks, a gas turbine portion 820 subject to state attacks, and sensors 830 subject to sensor attacks. By way of examples only, the sensors 830 might comprise physical and/or virtual sensors associated with temperatures, airflows, power levels, etc. The actuators might be associated with, for example, motors. By monitoring the information in the cyber-physical system, a threat detection platform may be able to detect cyber-attacks (e.g., using data-driven and residual feature vectors and a decision boundary) that could potentially cause a large amount of damage.

Figure 9:
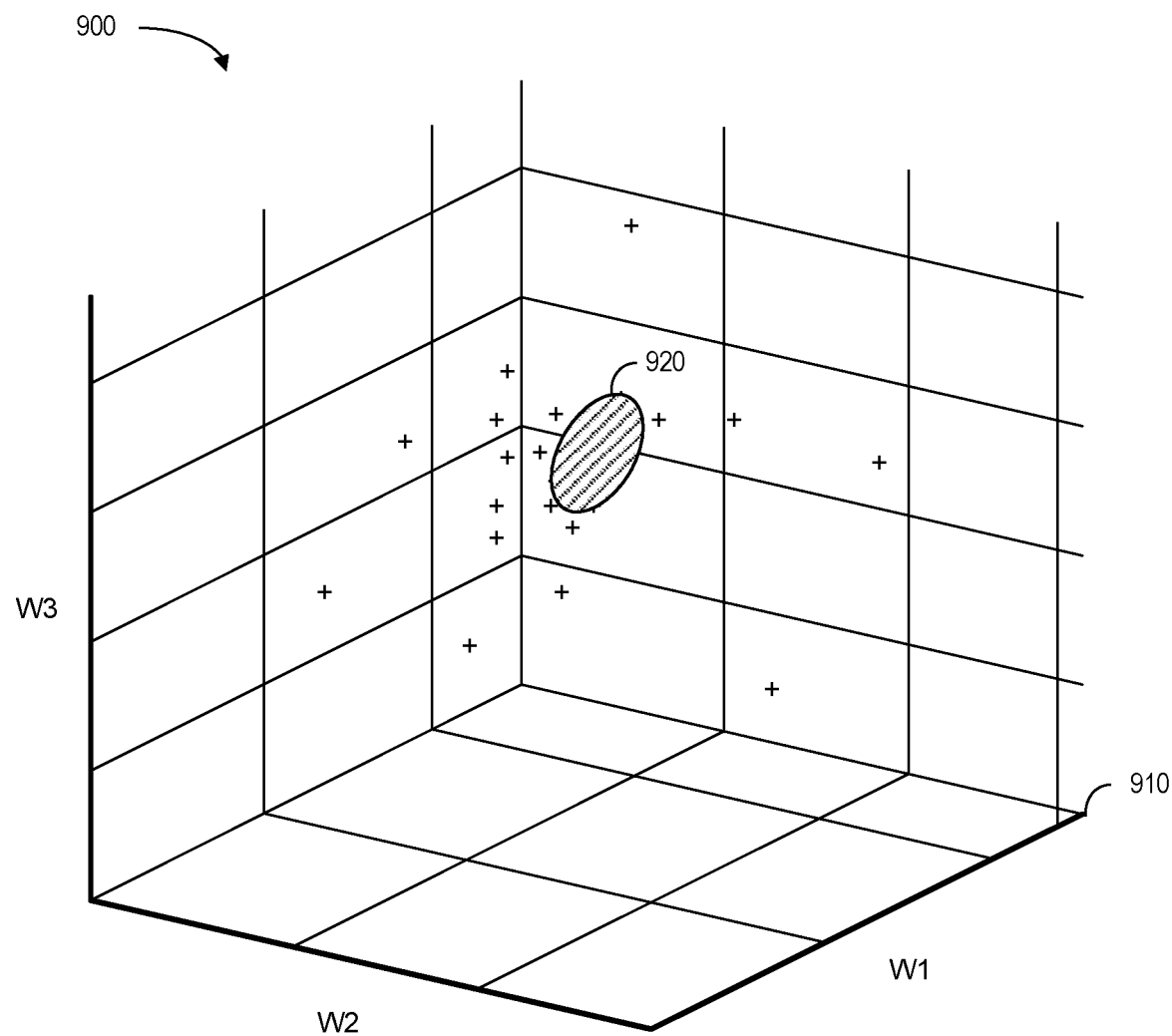
FIG. 9 illustrates three dimensions of sensor outputs in accordance with some embodiments.
Figure 10:
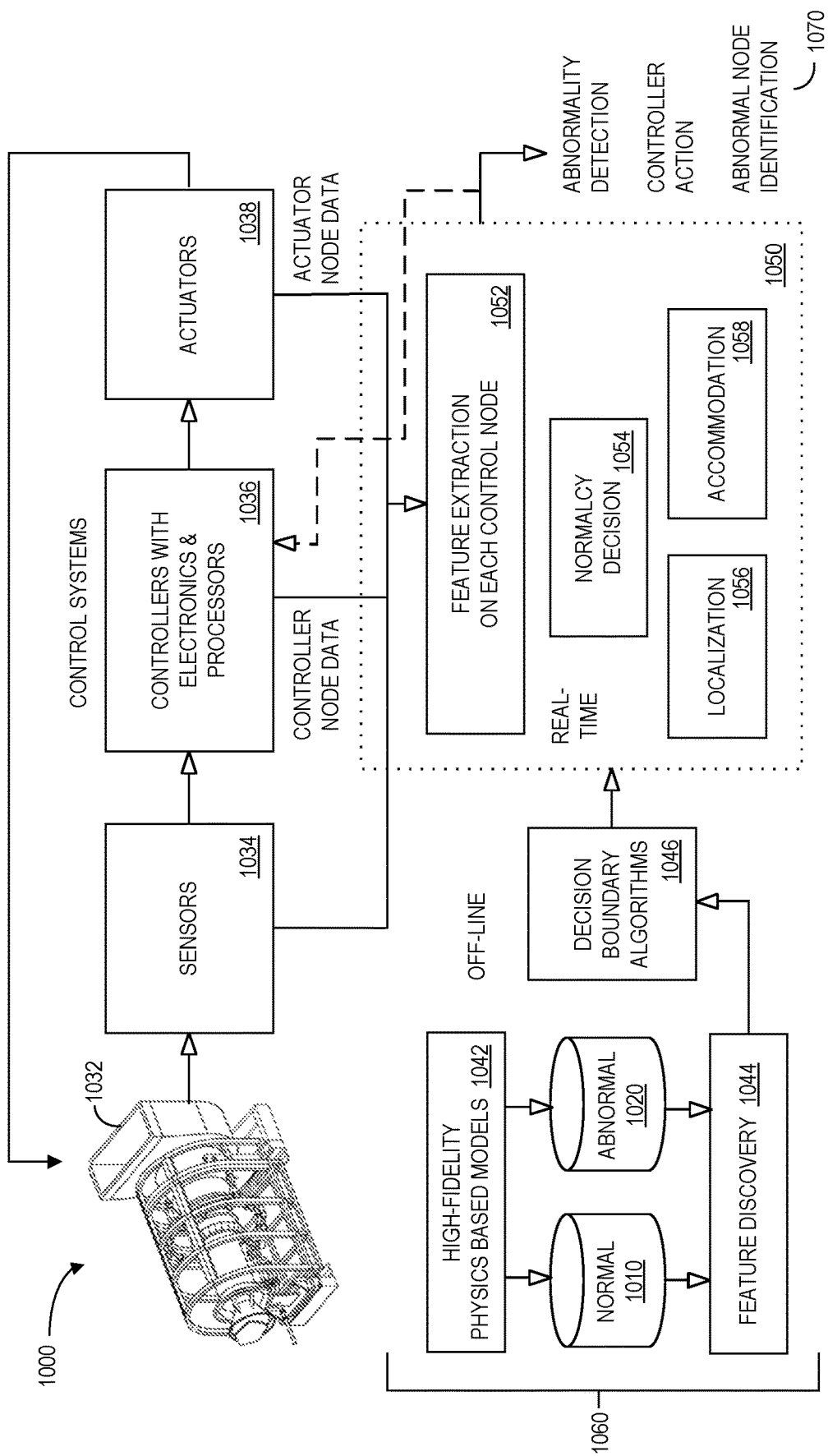
FIG. 10 is an abnormal alert system according to some embodiments.

FIG. 9 illustrates 900 three dimensions of monitoring node outputs in accordance with some embodiments. In particular, a graph 910 plots monitoring node outputs ("+") in three dimensions, such as dimensions associated with Principal Component Features ("PCF"): w1, w2, and w3. Moreover, the graph 910 includes an indication of a normal operating space decision boundary 920. Although a single contiguous boundary 920 is illustrated in FIG. 9, embodiments might be associated with multiple regions. Note that PCF information may be represented as weights in reduced dimensions. For example, data from each monitoring node may be converted to low dimensional features (e.g., weights). According to some embodiments, monitoring node data is normalized as follows:

$$S_{normalized}(k) = \frac{S_{nominal}(k) - S_{original}(k)}{\overline{S}_{nominal}}$$

where S stands for a monitoring node quantity at "k" instant of time. Moreover, output may then be expressed as a weighted linear combination of basis functions as follows:

$$S = S_0 + \sum_{j=1}^{N} w_j \Psi_j$$

where $S_0$ is the average monitoring node output with all threats, $w_j$ is the $j^{th}$ weight, and $\Psi_j$ is the $j^{th}$ basis vector. According to some embodiments, natural basis vectors are obtained using a covariance of the monitoring nodes' data matrix. Once the basis vectors are known, weight may be found using the following equation (assuming that the basis sets are orthogonal):

$$w_j = (S - S_0)^T \Psi_j$$

Note that weights may be an example of features used in a feature vector.

Thus, embodiments may enable the passive detection of indications of multi-class abnormal operations using real-time signals from monitoring nodes. Moreover, the detection framework may allow for the development of tools that facilitate proliferation of the invention to various systems (e.g., turbines) in multiple geolocations. According to some embodiments, distributed detection systems enabled by this technology (across multiple types of equipment and systems) will allow for the collection of coordinated data to help detect multi-prong attacks. Note that the feature-based approaches described herein may allow for extended feature vectors and/or incorporate new features into existing vectors as new learnings and alternate sources of data become available. As a result, embodiments may detect a relatively wide range of cyber-threats (e.g., stealth, replay, covert, injection attacks, etc.) as the systems learn more about their characteristics. Embodiments may also reduce false positive rates as systems incorporate useful key new features and remove ones that are redundant or less important. Note that the detection systems described herein may provide early warning to cyber-physical system operators so that an attack may be thwarted (or the effects of the attack may be blunted), reducing damage to equipment.

According to some embodiments, a system may further localize an origin of a threat to a particular monitoring node. For example, the localizing may be performed in accordance with a time at which a decision boundary associated with one monitoring node was crossed as compared to a time at which a decision boundary associated with another monitoring node was crossed. According to some embodiments, an indication of the particular monitoring node might be included in a threat alert signal.

Some embodiments of the algorithm may utilize feature-based learning techniques based on high-fidelity physics models and/or machine operation data (which would allow the algorithm to be deployed on any system) to establish a high dimensional decision boundary. As a result, detection may occur with more precision using multiple signals, making the detection more accurate with less false positives. Moreover, embodiments may detect multiple attacks on control signals, and rationalize where the root cause attack originated. For example, the algorithm may decide if a signal is anomalous because of a previous signal attack, or if it is instead independently under attack. This may be accomplished, for example, by monitoring the evolution of the features as well as by accounting for time delays between attacks.

A cyber-attack detection and localization algorithm may process a real-time cyber-physical system signal data stream and then compute features (multiple identifiers) which can then be compared to the signal-specific decision boundary. A block diagram of a system 1000 utilizing a signal-specific cyber-physical system abnormality detection and localization algorithm according to some embodiments is provided in FIG. 10. In particular, a gas turbine 1032 provides information to sensors 1034 which helps controllers with electronics and processors 1036 adjust actuators 1038. A threat detection system 1060 may include one or more high-fidelity physics-based models 1042 associated with the turbine 1032 to create normal data 1010 and/or abnormal data 1020. The normal data 1010 and abnormal data 1020 may be accessed by a feature discovery component 1044 and processed by decision boundary algorithms 1046 while off-line (e.g., not necessarily while the gas turbine 1032 is operating). The decision boundary algorithms 1046 may generate an abnormal model including decision boundaries for various monitoring nodes. Each decision boundary may separate two data sets in a high dimensional space which is constructed by running a binary classification algorithm, such as a support vector machine using the normal data 1010 and abnormal data 1020 for each monitoring node signal (e.g., from the sensors 1034, controllers 1036, and/or the actuators 1038).

A real-time threat detection platform 1050 may receive the boundaries along with streams of data from the monitoring nodes. The platform 1050 may include a feature extraction on each monitoring node element 1052 and a normalcy decision 1054 with an algorithm to detect attacks in individual signals using signal specific decision boundaries, as well rationalize attacks on multiple signals, to declare which signals were attacked (or are otherwise abnormal), and which became anomalous due to a previous attack on the system via a localization module 1056. An accommodation element 1058 may generate outputs 1070, such as an anomaly decision indication (e.g., an abnormal) alert signal, a controller action, and/or a list of abnormal monitoring nodes.

During real-time detection, contiguous batches of control signal data may be processed by the platform 1050, normalized and the feature vector extracted. The location of the vector for each signal in high-dimensional feature space may then be compared to a corresponding decision boundary. If it falls within the abnormal region, then a cyber-attack may be declared. The algorithm may then make a decision about where the attack originally occurred. An attack may sometimes be on the actuators 1038 and then manifested in the sensor 1034 data. Attack assessments might be performed in a post decision module (e.g., the localization element 1056) to isolate whether the attack is related to the sensor, controller, or actuator (e.g., indicating which part of the monitoring node). This may be done by individually monitoring, overtime, the location of the feature vector with respect to the hard decision boundary. For example, when a sensor 1034 is spoofed, the attacked sensor feature vector will cross the hard decision boundary earlier than the rest of the vectors as described with respect to FIGS. 11 through 13. If a sensor 1034 is declared to be anomalous, and a command to the auxiliary equipment is later determined to be anomalous, it may be determined that the original attack, such as signal spoofing, occurred on the sensor 1034. Conversely, if the signal to the auxiliary equipment was determined to be anomalous first, and then later manifested in the sensor 1034 feedback signal, it may be determined that the signal to the equipment was initially attacked.

According to some embodiments, it may be detected whether or not a signal is in the normal operating space (or abnormal space) through the use of localized decision boundaries and real-time computation of the specific signal features. Moreover, an algorithm may differentiate between a sensor being attacked as compared to a signal to auxiliary equipment being attacked. The control intermediary parameters and control logical(s) may also be analyzed using similar methods. Note that an algorithm may rationalize signals that become anomalous. An attack on a signal may then be identified.

Figure 11:
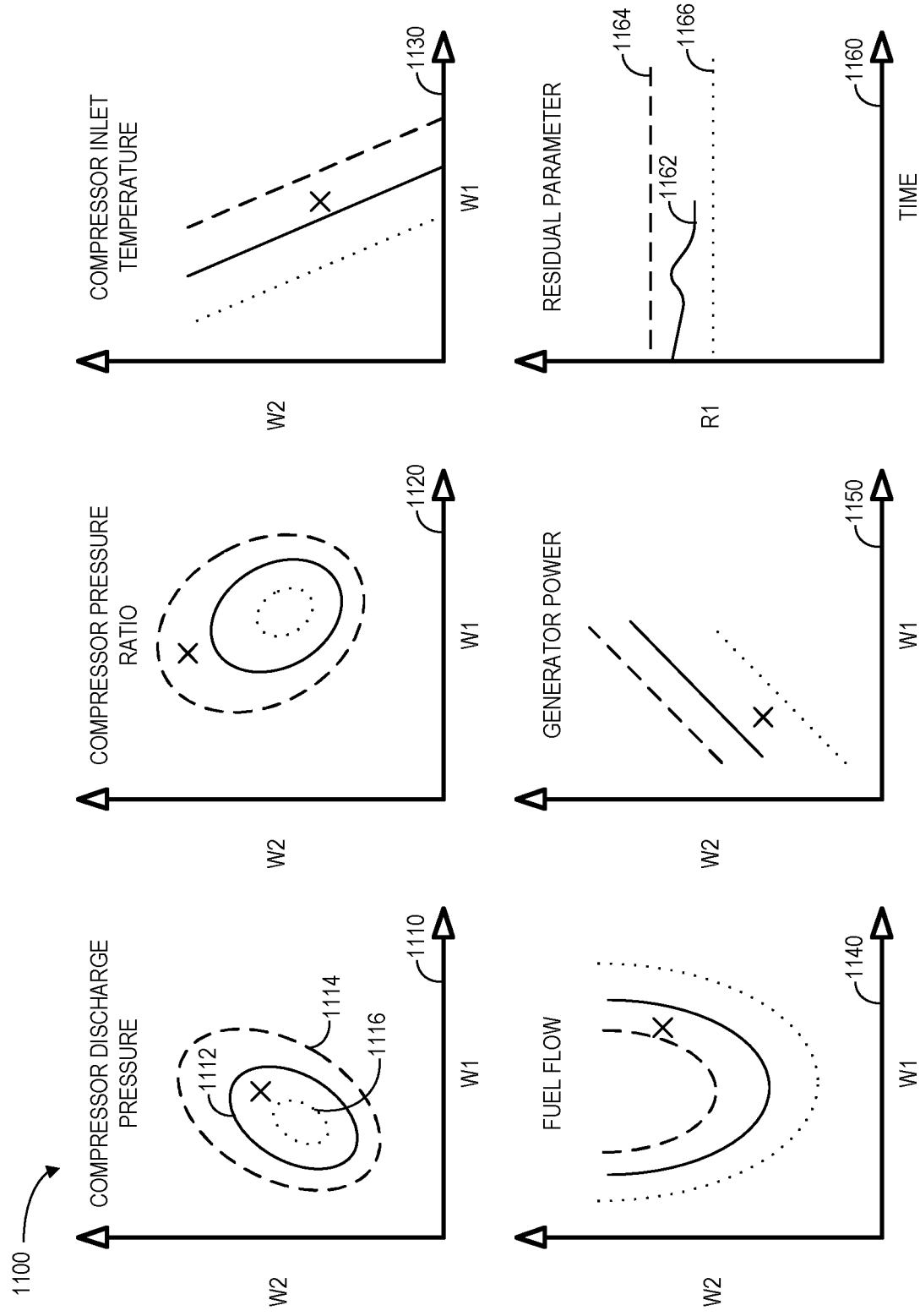
FIGS. 11 through 13 illustrate boundaries and locations of feature vectors for various parameters in accordance with some embodiments.

FIG. 11 illustrates 1100 boundaries and feature vectors for various monitoring node parameters in accordance with some embodiments. In particular, for each parameter a graph includes a first axis representing value weight 1 ("w1"), a feature 1, and a second axis representing value weight 2 ("w2"), a feature 2. Values for w1 and w2 might be associated with, for example, outputs from a Principal Component Analysis ("PCA") that is performed on the input data. PCA might be one of the features that might be used by the algorithm to characterize the data, but note that other features could be leveraged.

A graph is provided for five data-driven features: compressor discharge temperature 1110, compressor pressure ratio 1120, compressor inlet temperature 1130, fuel flow 1140, and generator power 1150. Each graph includes a hard boundary 1112 (solid curve), inner boundary 1116 (dotted curve), and outer boundary 1114 (dashed curve) and an indication associated with current feature location for each monitoring node parameter (illustrated with an "X" on the graphs). As illustrated in FIG. 11, the current monitoring node location is between the minimum and maximum boundaries (that is, the "X" is between the dotted and dashed lines). As a result, the system may determine that the operation of the cyber-physical system control system is normal (and no threat is being detected indicating that the system is currently under attack or that a naturally occurring fault has occurred). FIG. 11 further illustrates a residual value ("R1") over time 1160 graph. The current value of the residual 1162 is between threshold values 1164, 1166 and, as a result, this also indicates normal operation of the system.

Figure 12:
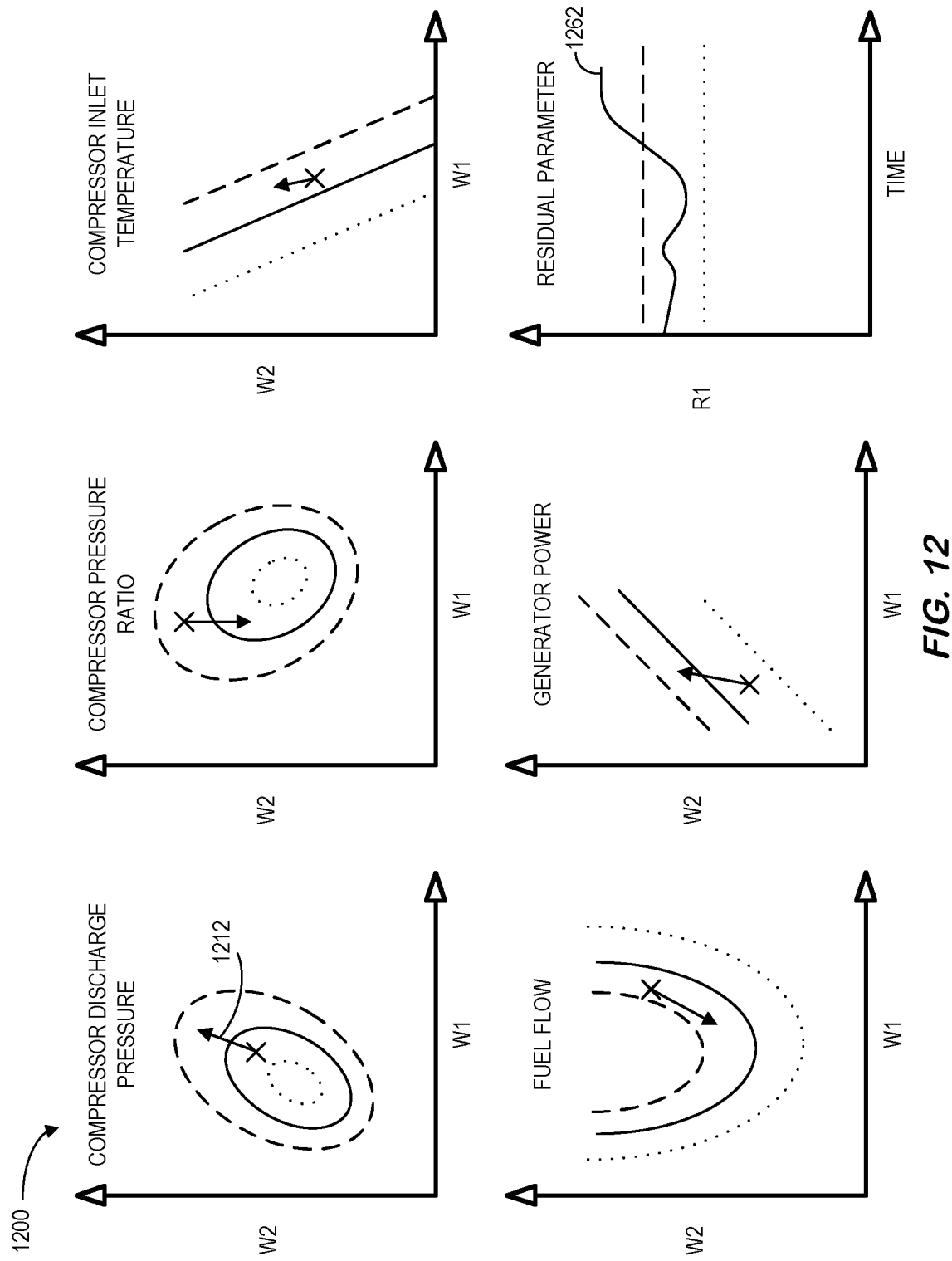

FIG. 12 illustrates 1200 subsequent boundaries and feature vectors for these parameters. Consider, for example, a feature vector movement 1212 for the compressor discharge pressure. Even though feature vector 1212 has moved, it is still within the maximum and minimum boundaries and, as a result, normal operation of that monitoring node may be determined. This is the case for the first five graphs in FIG. 12. In this example, the current residual value 1262 has moved outside an associated threshold and, as a result, abnormal operation of that monitoring node may be determined. For example, a threat may exist for the exhaust temperature scale factor, which is a corrective value. The result is that the residual feature for the intermediary monitoring node signal feature vector illustrated in FIG. 12 moves 1262 such that it is anomalous. The algorithm detects this cyber-attack, and two parallel actions might be initiated. One action may be post processing of the signal to discover what was attacked, in this case if the system has been monitoring each exhaust thermocouple, it may conclude that none of them are currently abnormal. Therefore, it may be determined that something used to calculate this feature was attacked. The other action may be to continually monitor and detect additional attacks. Such an approach may facilitate a detection of multiple signal attacks.

Given the example of FIG. 12, assume that the gas turbine exhaust temperature signal was attacked. This may cause the system to respond in such a way so as to put other signals into an abnormal state. This is illustrated 1300 in FIG. 13, where the attack has already been detected and now other signals shown to be abnormal. In particular, feature movement for the compressor discharge pressure 1312, compressor pressure ratio 1322, compressor inlet temperature 1332, and fuel flow 1342 have all become abnormal (joining the residual parameter 1362). Note that the feature vector for generator power did not become abnormal. In order to decide whether or not these signals 1312, 1322, 1332, 1342 are truly currently under attack, a historical batch with pertinent feature vector information may be kept for some duration of time. Then when an attack is detected on another signal, this batch is examined, and the time at which the confirmed attack on gas turbine exhaust temperature as well as several subsequent elements is analyzed.

Note that one signal rationalization might be associated with a system time delay. That is, after a sensor is attacked there might be a period of time before the system returns to a steady state. After this delay, any signal that becomes anomalous might be due to an attack as opposed to the system responding.

The current methods for detecting abnormal conditions in monitoring nodes are limited to Fault Detection Isolation and Accommodation ("FDIA"), which itself is very limited. The hybrid cyber-attack detection and localization algorithms described herein can not only detect abnormal signals of sensors, but can also detect signals sent to auxiliary equipment, control intermediary parameters and/or control logical(s). The algorithms may also understand multiple signal attacks. One challenge with correctly identifying a cyber-attack threat is that it may occur with multiple sensors being impacted by malware. According to some embodiments, an algorithm may identify in real-time that an attack has occurred, which sensor(s) are impacted, and declare a fault response. To achieve such a result, the detailed physical response of the system must be known to create acceptable decision boundaries. This might be accomplished, for example, by constructing data sets for normal and abnormal regions by running DoE experiments on high-fidelity models. A data set for each sensor might comprise a feature vector for given threat values (e.g., temperature, airflow, etc.). Full factorial, Taguchi screening, central composite and Box-Behnken are some of the known design methodologies used to create the attack space. When models are not available, these DoE methods are also used to collect data from real-world cyber-physical systems. Experiments may be run at different combinations of simultaneous attacks. In some embodiments, the system may detect degraded/faulty operation as opposed to a cyber-attack. Such decisions might utilize a data set associated with a degraded/faulty operating space. At the end of this process, the system may create data sets such as "attack v/s normal" and "degraded v/s normal" for use while constructing decision boundaries. Further note that a decision boundary may be created for each signal using data sets in feature space. Various classification methods may be used to compute decision boundaries. For example, binary linear and non-linear supervised classifiers are examples of methods that could be used to obtain a decision boundary.

Figure 13:
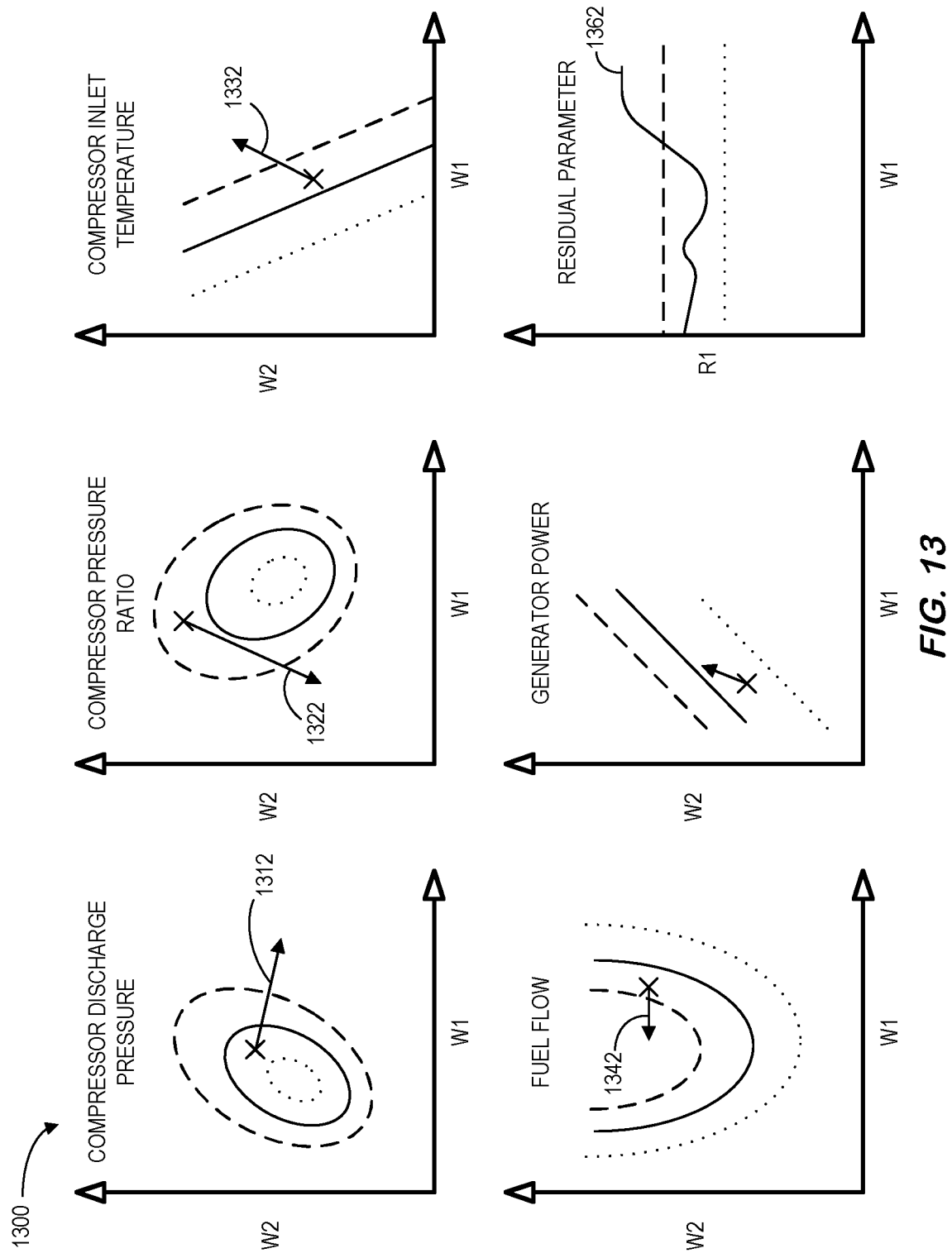

Note that multiple vector properties might be examined, and the information described with respect to FIGS. 11 through 13 may be processed to determine if the signal had been trending in a specific direction as the attack was detected (or if it had just been moving due to noise). Had the signal been uniformly trending as the attack took place and afterward, then this signal is a response to the original attack and not an independent attack.

According to some embodiments, the system may localize or otherwise analyze an origin of the threat to a particular monitoring node. For example, the localizing may be performed in accordance with a time at which a decision boundary associated with one monitoring node was crossed as compared to a time at which a decision boundary associated with another monitoring node was crossed. According to some embodiments, an indication of the particular monitoring node might be included in the threat alert signal.

Some embodiments described herein may take advantage of the physics of a cyber-physical system by learning a priori from tuned high-fidelity equipment models and/or actual "on the job" data to detect single or multiple simultaneous adversarial threats to the system. Moreover, according to some embodiments, all monitoring node data may be converted to features using advanced feature-based methods, and the real-time operation of the cyber-physical system may be monitored in substantially real-time. Abnormalities may be detected by classifying the monitored data as being "normal" or disrupted (or degraded). This decision boundary may be constructed using dynamic models and may help to enable early detection of vulnerabilities (and potentially avert catastrophic failures) allowing an operator to restore the cyber-physical system to normal operation in a timely fashion.

Thus, some embodiments may provide an advanced hybrid anomaly detection algorithm to detect cyber-attacks on, for example, key cyber-physical system control sensors. The algorithm may identify which signals(s) are being attacked using control signal-specific decision boundaries and may inform a cyber-physical system to take accommodative actions. In particular, a detection and localization algorithm might detect whether a sensor, auxiliary equipment input signal, control intermediary parameter, or control logical are in a normal or anomalous state. Some examples of cyber-physical system monitoring nodes that might be analyzed include: critical control sensors; control system intermediary parameters; auxiliary equipment input signals; and/or logical commands to controller.

A cyber-attack detection and localization algorithm may process a real-time cyber-physical system signal data stream and then compute features (multiple identifiers) which can then be compared to the sensor specific decision boundary. In some embodiments, generating features may involve simply performing an identity transform. That is, the original signal might be used as it is.

Feature vectors, including those based on data-driven and residual values, may be generated on a monitoring-node-by-monitoring node basis and may be considered "local" to each particular monitoring node. FIG. 14 is an example of a "global" abnormality protection system 1400 in accordance with some embodiments when multiple gas turbines are involved in a system. In particular, the system 1400 includes three turbines (A, B, and C) and batches of values 1410 from monitoring nodes are collected for each generated over a period of time (e.g., 60 to 80 seconds). According to some embodiments, the batches of values 1410 from monitoring nodes overlap in time. The values 1410 from monitoring nodes may, for example, be stored in a matrix 1420 arranged by time ($t_1$, $t_2$, etc.) and by type of monitoring node ($S_1$, $S_5$, etc.). Feature engineering components 1430 may use information in each matrix 1420 to create a feature vector 1440 for each of the three turbines (e.g., the feature vector 1440 for turbine C might include $FS_{C1}$, $FS_{C2}$, etc.). The three feature vectors 1440 may then be combined into a single global feature vector 1450 for the system 1400. Interaction features 1460 may be applied (e.g., associated with A*B*C, A+B+C, etc.) and an anomaly detection engine 1470 may compare the result with a decision boundary and output a global abnormal alert signal when appropriate.

Thus, a system may generate both local normal/abnormal decisions (for each monitoring node) and a global normal/abnormal decision (for the entire cyber-physical system). According to some embodiments, the system may provide for abnormality detection (e.g., cyber-attacks and faults) using a "hybrid" approach such that features are extracted through machine learning techniques combined with model-based features computed using residual generating stochastic filters. The hybrid feature vector may leverage information extracted via data-driven approaches as well information associated with dynamic models used in controls and state estimation. The hybrid feature extraction approach may work at both the global (system) and local (monitoring node) level.

Note that industrial control systems (e.g., gas turbines, wind turbines, etc.) may largely exhibit transit behaviors due to the transient and stochastic natures of their disturbances, set-points, or driving forces (e.g., wind). As a result, it may be helpful to capture effective features for abnormality classification, both at the global (system) and local (node) levels. Feature discovery techniques mostly rely on data driven approaches, resulting in outcomes such as shallow (e.g., statistical) or deep learning-based features.

Some embodiments may utilize time-series data from a collection of monitoring nodes (sensor, actuator, or controller nodes) and extract features from the time series data for each monitoring node. The term "feature" may refer to, for example, mathematical characterizations of data. Examples of features as applied to data might include the maximum and minimum, mean, standard deviation, variance, settling time, FFT spectral components, linear and non-linear principal components, independent components, sparse coding, deep learning, etc. The type and number of features for each monitoring node might be optimized using domain-knowledge, feature engineering, or ROC statistics. The local features for each monitoring node may be stacked to create a global feature vector (as described in connection with FIG. 14. The global feature vector may also contain interactive feature involving two or more monitoring nodes (e.g., a cross-correlation between two nodes). The features may be normalized, and the dimension of the global feature vector can then be further reduced using any dimensionality reduction technique, such as PCA. The features may be calculated over a sliding window of the signal time series, with the length of the window and the duration of slide being determined from domain knowledge, inspection of the data, and/or batch processing.

According to some embodiments, "hybrid" data-driven and residual-based features may be utilized. That is, in addition to the data-driven features, model-based residuals may be used as features for classification decision making. This approach may eliminate the need to find a threshold for a residual parameter as the relation between the residual and attack detection decision may be learned automatically through the machine leaning techniques that are used to train the classifiers. Furthermore, temporal features of the residual signal (such as its rate of change) may be added as additional features (features of a feature) to be used for classification. The residual may be generated using a stochastic filter (e.g., KF, EKF or UKF) that uses a dynamic model of the system in LTI, LTV, LPV, or nonlinear forms.

Figure 15:
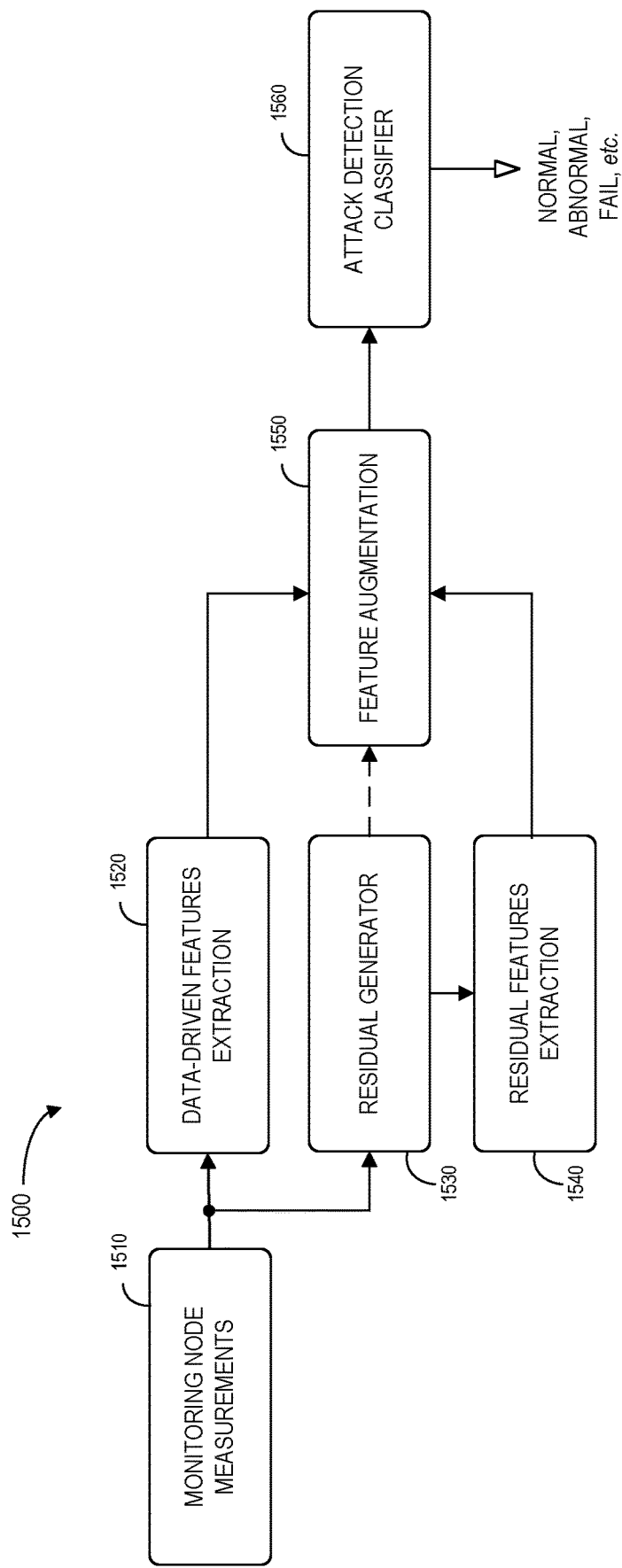
FIG. 15 is a hybrid approach to attack detection at the system level according to some embodiments.

FIG. 15 is a hybrid approach 1500 to attack detection at the system level according to some embodiments. In particular, monitoring node measurements 1510 are provided to data-driven features extraction 1520. Once extracted, the data-driven features may be augmented 1550 and used by an attack detection classifier 1560 (e.g., to indicate a normal or abnormal classification). The monitoring node measurements 1510 may also be provided to a residual generator 1530 that performs residual features extraction 1540. Once extracted, the residual features may be augmented 1550 and used by the attack detection classifier 1560 (e.g., to indicate a normal or abnormal classification). According to some embodiments, feature augmentation 1550 may be performed directed on the results of the residual generator 1530 (e.g., as illustrated by a dotted arrow in FIG. 15). The classification decision boundary for global detection may be computed using any of the methods described in connection with FIG. 14.

Thus, hybrid embodiments described herein may help solve the challenge of finding a right threshold for residual based anomaly detection and FDI systems. Embodiments may also provide a systematic way to combine data-driven features with model-based residual features in a machine learning classification framework.

Figure 16:
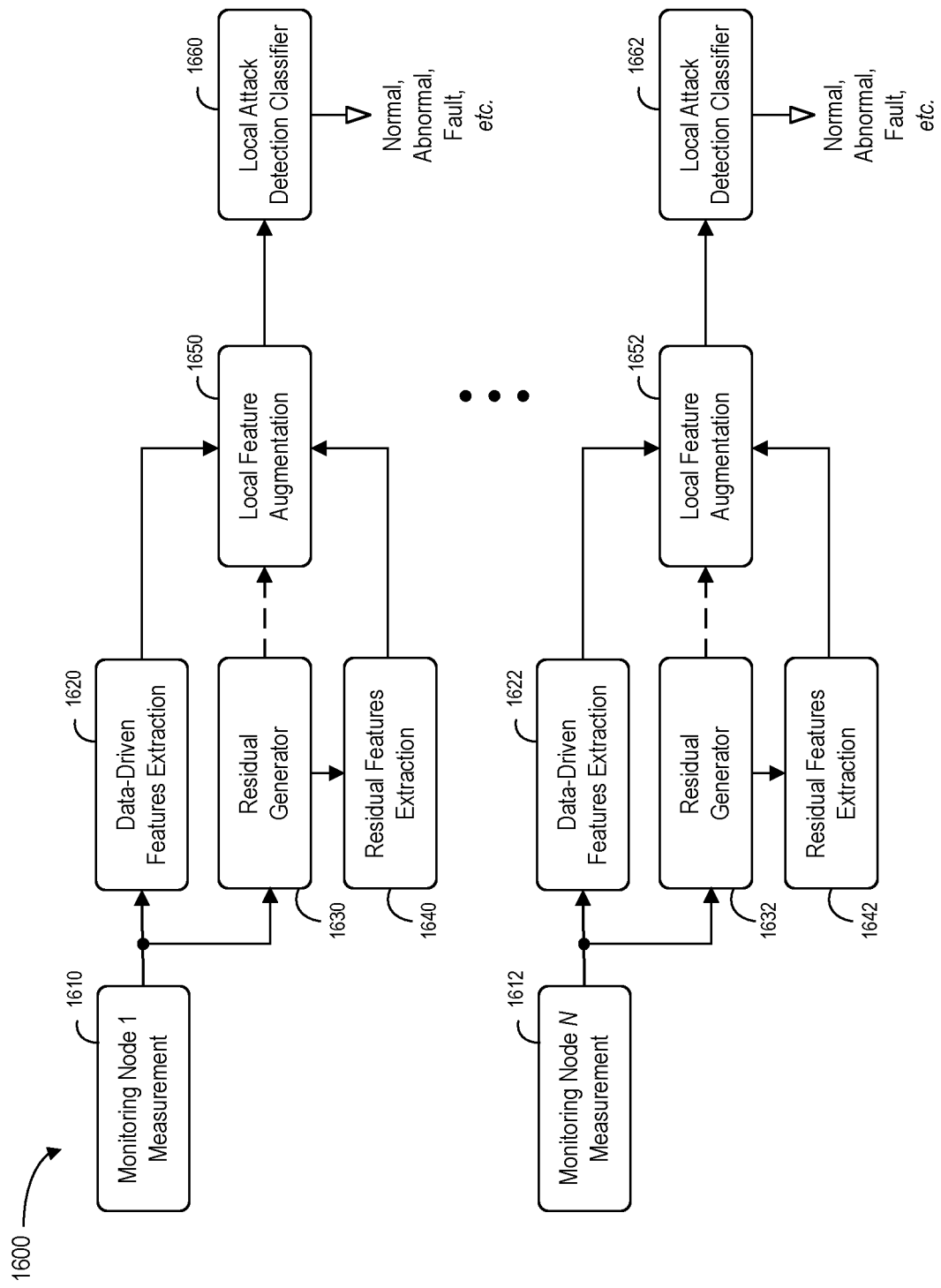
FIG. 16 is a hybrid approach to attack detection at the node level in accordance with some embodiments.

For attack localization, individual residuals may be generated for each monitoring node and augmented with the local features of each monitoring node. FIG. 16 is a hybrid approach 1600 to attack detection at the node level in accordance with some embodiments. The residual generating filter (e.g., a Kalman filter) at each node may only generate the residual for that particular output corresponding to each particular monitoring node. As before, monitoring node measurements 1610 for monitoring node 1 are provided to data-driven features extraction 1620. Once extracted, the data-driven features may be augmented 1650 and used by an attack detection classifier 1660. The monitoring node measurements 1610 for monitoring node 1 may also be provided to a residual generator 1630 that performs residual features extraction 1640. Once extracted, the residual features may be augmented 1650 and used the attack detection classifier 1660. Similarly, monitoring node measurements 1612 for monitoring node N are provided to data-driven features extraction 1622. Once extracted, the data-driven features for node N may be augmented 1652 and used by an attack detection classifier 1662. The monitoring node measurements 1612 for monitoring node N may also be provided to a residual generator 1632 that performs residual features extraction 1642. Once extracted, the residual features may be augmented 1652 and used by the attack detection classifier 1662. After the local feature vectors are computed, the classification decision boundaries for localization may be developed, e.g. as described with respect to FIGS. 17 and 18.

Figure 17:
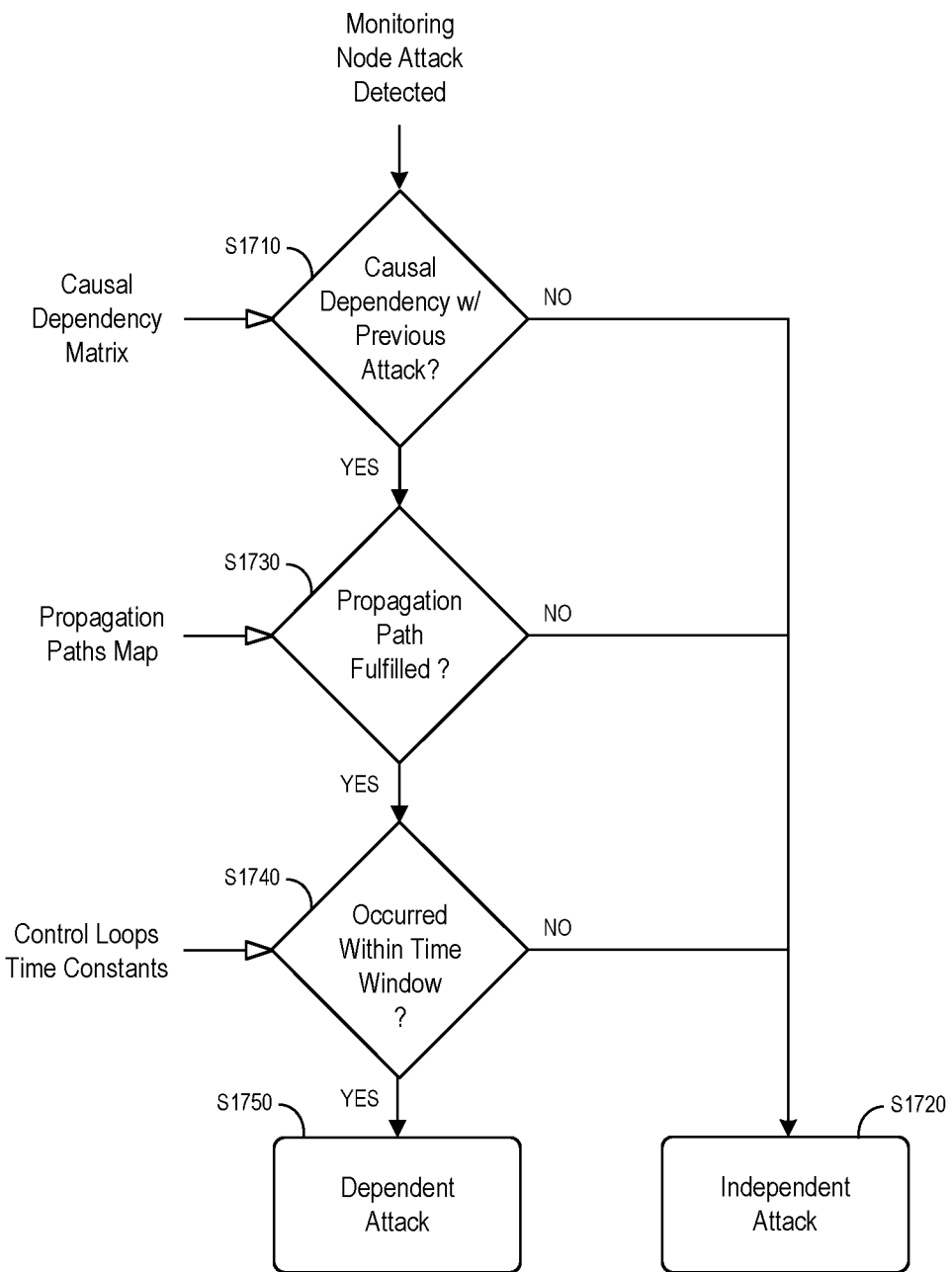
FIG. 17 is a method of determining whether an attack is an independent attack or dependent attack in accordance with some embodiments.
Figure 18:
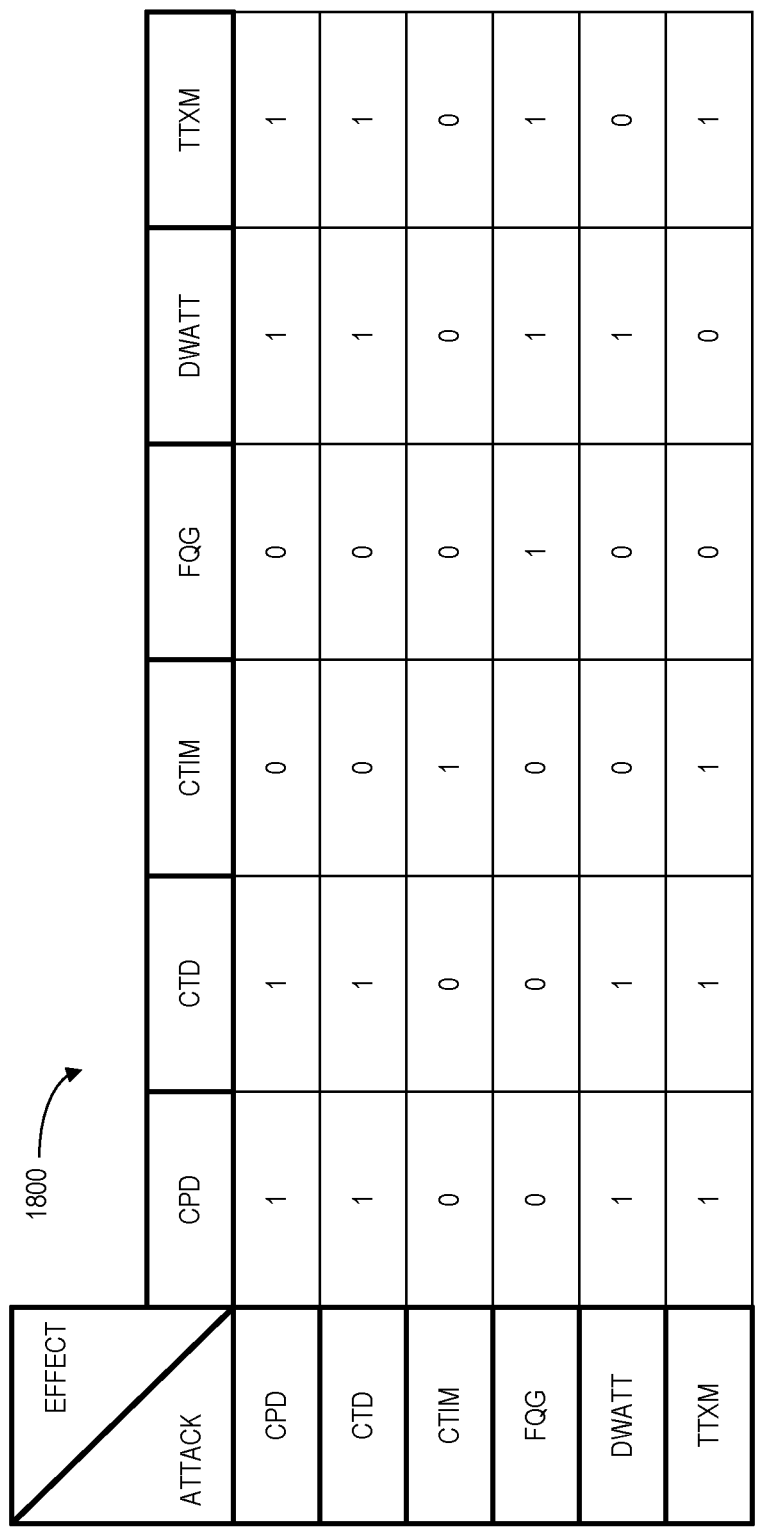
FIG. 18 is a causal dependency matrix of monitoring nodes according to some embodiments.

For example, FIG. 17 is a method of determining whether an attack is an independent attack or dependent attack in accordance with some embodiments. According to some embodiments, three tests may be performed to determine if an attack should be classified as an "independent attack" or a "dependent attack:" (1) a causal dependency test, (2) a propagation path test, and (3) a time separation test. Together, these three tests may be referred to herein as an "attack dependency conformance test." At S1710, a causal dependency matrix may be used to determine if the current attack was potentially caused by a previous attack. If the current attack could not have been caused by a previous attack at S1710, it is classified as an "independent attack" at S1720. In this causality test, the system may check whether there is a potential causal dependency between the newly detected attack and any previously detected attack on other monitoring nodes. This check might be based on, for example, a binary matrix of causal dependencies between any two nodes (e.g., as described with respect to FIG. 18). The causal dependency matrix might be generated, according to some embodiments, based on domain knowledge. FIG. 18 is a causal dependency matrix 1800 of monitoring nodes according to some embodiments. In this case, there is causal dependency and a direct proportion path from CTD to CPD. The matrix 1800 lists each potential attack node and whether or not that node can have an effect on each other node (with a "1" indicating a potential effect and a "0" indicating no potential effect). Referring again to FIG. 17, if no such possible dependencies exist the attack is reported as an "independent attack" at S1720. Otherwise, the system may perform a second check.

At S1730 a propagation paths map may be used to determine if the current attack potentially propagated from a previous attack. If the current attack could not have propagated from a previous attack at S1730, it is classified as an "independent attack" at S1720. In this propagation test, for each causal dependency the system may check whether a propagation path is fulfilled. This might mean that, for example, if the effect of node 1 being under attack is propagated to node 4, through node 3, then an anomaly in node 1 can cause an anomaly on node 4 only if node 3 is already anomalous. The anomaly propagation paths might also be defined by domain knowledge and pre-stored in the localization system. If no such propagation paths are fulfilled, then the attack is reported an "independent attack" at S1720. Otherwise, the system may perform the third check.

At S1740, control loops time constraints may be used to determine if the current attack was potentially caused by a previous attack based on time separation. If the current attack could not have been caused by a previous attack based on time separation at S1740, it is classified as an "independent attack" at S1720. This time separation test may utilize the fact that if the attacked monitoring under investigation is an artifact of the closed-loop feedback system, then the effect should arise within a time window between the rise time and the settling time of the control loop corresponding to the monitoring node. However, since the system uses a dynamic estimator, a propagation time may need to be added throughout the estimator. Using n features, and p lags in the models, the dynamic estimator will have n*p states, and therefore adds n*p sampling times delay into the system. Therefore, the expected time window for a dependent attack to occur might be defined by:

$$1.5*\tau + n*p < \Delta t < 5*\tau + n*p$$

where $\Delta t$ is the time after any previously detected attacks on other nodes that has passed checks 1 and 2, and $\tau$ is the time constant of the control loop responsible for the current node under investigation. If such a time-separation check is not passed, the system reports the attack as an independent attack at S1720.

If it is determined at S1750 that the current attack meets the time separation test (and, therefore, also meets both the propagation test of S1730 and the causal dependency test of S1740), the current attack is classified as a "dependent attack" at S1750.

Note that other attack and anomaly detection techniques may only provide a binary status of the overall system (whether it is under attack or not). Embodiments described herein may also provide an additional layer of information by localizing the attack and determining not only if the system is under attack (or not) but also which node is exactly under attack. Note that attack localization information may be important when responding to the attack, including operator action plans and resilient control under attack. Embodiments described herein may handle multiple simultaneous anomalies in the system, which is beyond the capability of the conventional fault detection systems. This may also let the approaches described herein be used as a fault detection and isolation technique for more sophisticated, multiple-fault scenarios. Further, distributed detection and localization systems enabled by embodiments described herein across multiple equipment and systems may allow for a coordination of data to detect and precisely pin-point coordinated multi-prong attacks. This may further enable a relatively quick way to perform forensics and/or analysis after an attack.

Note that some embodiments may analyze information in the feature space, which has many advantages over working in the original signal spaces, including high-level data abstraction and modeling high dimensional spaces without adding substantial computational complexity. The feature-based method for localization may also extend feature vectors and/or incorporate new features into existing vectors as new learnings or alternate sources of data become available. Embodiments described herein may also enable use of heterogeneous sensor data in a large scale interconnected system, even when the data comes from many geospatially located heterogeneous sensors (i.e., conventional plant sensors, unconventional sensors such as cell-phone data, logical, etc.). This may offer additional commercial advantages for post-mortem analysis after an attack.

Figure 19:
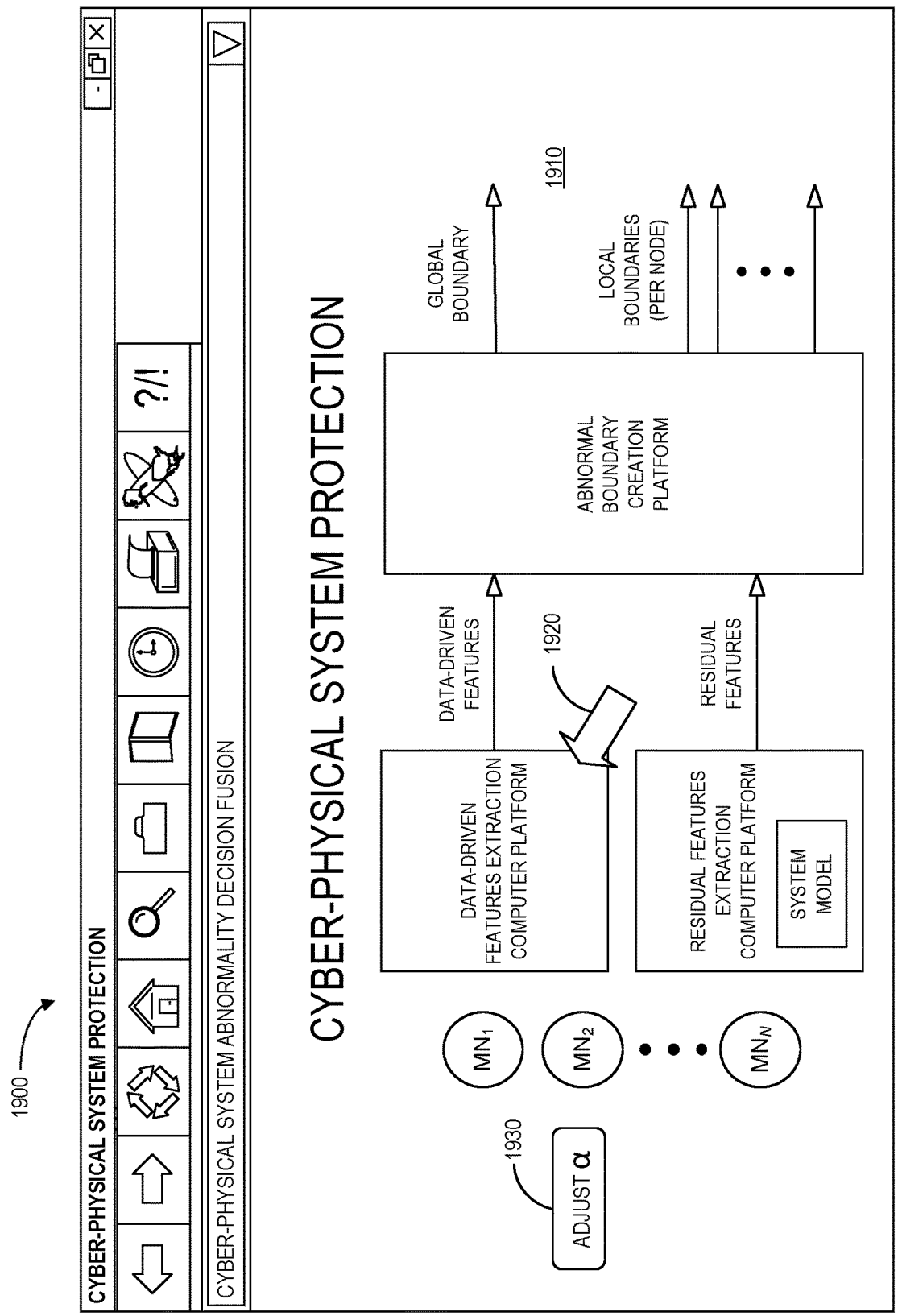
FIG. 19 is a cyber-physical system protection system display in accordance with some embodiments.

FIG. 19 is an example of a cyber-physical system protection display 1900 that might be used, for example, to provide a graphical depiction 1910 to an operator and/or to provide an interactive interface allowing an administrator to adjust system components as appropriate. Selection of an element on the display 1900 (e.g., via a touchscreen or computer mouse pointer 1920) may let the operator see more information about that particular element (e.g., in a pop-up window) and/or adjust operation of that element (e.g., by altering how global features are extracted or a tuning parameter $\alpha$).

Figure 20:
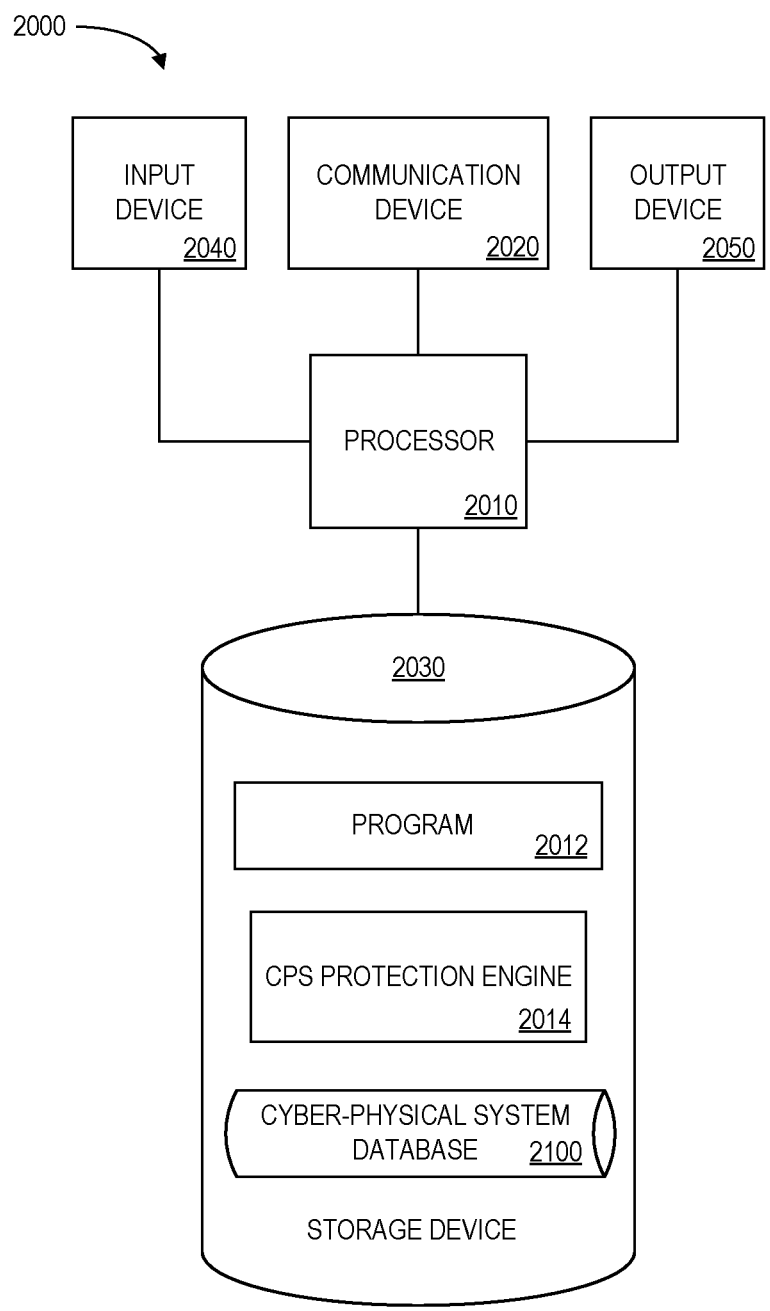
FIG. 20 is a cyber-physical system protection platform according to some embodiments.

Note that the embodiments described herein may be implemented using any number of different hardware configurations. For example, FIG. 20 is a block diagram of a cyber-physical system protection platform 2000 that may be, for example, associated with the systems 100, 300 of FIGS. 1 and 3, respectively, and/or any other system described herein. The cyber-physical system protection platform 2000 comprises a processor 2010, such as one or more commercially available Central Processing Units ("CPUs") in the form of one-chip microprocessors, coupled to a communication device 2020 configured to communicate via a communication network (not shown in FIG. 20). The communication device 2020 may be used to communicate, for example, with one or more remote monitoring nodes, user platforms, digital twins, etc. The cyber-physical system protection platform 2000 further includes an input device 2040 (e.g., a computer mouse and/or keyboard to input cyber-physical system parameters and/or modeling information) and/an output device 2050 (e.g., a computer monitor to render a display, provide alerts, transmit recommendations, and/or create reports). According to some embodiments, a mobile device, monitoring physical system, and/or PC may be used to exchange information with the cyber-physical system protection platform 2000.

The processor 2010 also communicates with a storage device 2030. The storage device 2030 may comprise any appropriate information storage device, including combinations of magnetic storage devices (e.g., a hard disk drive), optical storage devices, mobile telephones, and/or semiconductor memory devices. The storage device 2030 stores a program 2012 and/or cyber-physical system protection engine 2014 for controlling the processor 2010. The processor 2010 performs instructions of the programs 2012, 2014, and thereby operates in accordance with any of the embodiments described herein. For example, the processor 2010 may receive, from a set of monitoring nodes, a series of current monitoring node values over time that represent current operation of a cyber-physical system. The processor 2010 may generate current data-driven feature vectors based on the series of current monitoring node values. The processor 2010 may also execute a system model and utilize a stochastic filter to determine current residual values. The processor 2010 may then generate current residual-driven feature vectors based on the current residual values. The processor may compare the current data-driven and residual-driven feature vectors with at least one decision boundary associated with an abnormal detection model. An abnormal alert signal may then be transmitted when appropriate based on a result of said comparison.

The programs 2012, 2014 may be stored in a compressed, uncompiled and/or encrypted format. The programs 2012, 2014 may furthermore include other program elements, such as an operating system, clipboard application, a database management system, and/or device drivers used by the processor 2010 to interface with peripheral devices.

As used herein, information may be "received" by or "transmitted" to, for example: (i) the cyber-physical system protection platform 2000 from another device; or (ii) a software application or module within the cyber-physical system protection platform 2000 from another software application, module, or any other source.

In some embodiments (such as the one shown in FIG. 20), the storage device 2030 further stores a cyber-physical system database 2100. An example of a database that may be used in connection with the cyber-physical system protection platform 2000 will now be described in detail with respect to FIG. 21. Note that the database described herein is only one example, and additional and/or different information may be stored therein. Moreover, various databases might be split or combined in accordance with any of the embodiments described herein.

Figure 21:
FIG. 21 is portion of a tabular cyber-physical system database in accordance with some embodiments.

Referring to FIG. 21, a table is shown that represents the cyber-physical system database 2100 that may be stored at the cyber-physical system protection platform 2000 according to some embodiments. The table may include, for example, entries identifying cyber-physical systems to be protected and associated monitoring nodes. The table may also define fields 2102, 2104, 2106, 2108, 2110, 2112, 2114 for each of the entries. The fields 2102, 2104, 2106, 2108, 2110, 2112, 2114 may, according to some embodiments, specify: a cyber-physical system identifier 2102, a cyber-physical system description 2104, a monitoring node identifier 2106, local data-driven feature vectors 2108, global data-driven feature vectors 2110, local residual feature vectors 2112, and global residual feature vectors 2114. The cyber-physical system database 2100 may be created and updated, for example, when a new physical system is monitored or modeled, an attack is detected, etc.

The cyber-physical system identifier 2102 and description 2104 may define a particular asset or system that will be protected. The monitoring node identifier 2106 may specify a sensor, actuator, etc. that provides a time series of values describing the operation of the cyber-physical system (e.g., as illustrated in FIG. 21, three monitoring nodes are all associated with a single cyber-physical system identifier 2102). The local data-driven feature vectors 2108 and global data-driven feature vectors 2110 may be based on features extracted from times series data for each monitoring node. The local residual feature vectors 2108 and global residual feature vectors 2110 may be generated using a stochastic filter that uses a dynamic model of the system.

Thus, embodiments may provide technical improvements to cyber-physical system protection by eliminating the need to set up residual thresholds, increasing detection rates, decreasing the alarm rate, etc. Moreover, embodiments may make model-based feature discovery implementation automatic and systematic. Some embodiments may also provide business improvements by enabling a substantially seamless integration of data-driven feature machine learning into existing or legacy FDI systems, empowering legacy protection mechanisms to be used in new detection/localization frameworks, and/or increasing asset availability and reliability with higher anomaly detection rates and fewer false alarms.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present invention (e.g., some of the information associated with the databases described herein may be combined or stored in external systems). Moreover, although some embodiments are focused on gas turbines, any of the embodiments described herein could be applied to other types of cyber-physical systems including power grids, dams, locomotives, additive printers, data centers, airplanes, and autonomous vehicles (including automobiles, trucks, drones, submarines, etc.).

The present invention has been described in terms of several embodiments solely for the purpose of illustration. Persons skilled in the art will recognize from this description that the invention is not limited to the embodiments described but may be practiced with modifications and alterations limited only by the spirit and scope of the appended claims.

The invention claimed is:

1. A system having a plurality of monitoring nodes each generating a series of current monitoring node values over time that represent current operation of a cyber-physical system, comprising:
   a data-driven features extraction computer platform having a memory and a computer processor adapted to:
      receive the series of current monitoring node values, and
      generate current data-driven feature vectors based on the series of current monitoring node values;
   a residual features extraction computer platform having a memory and a computer processor adapted to:
      receive the series of current monitoring node values,
      execute a system model and utilize a stochastic filter together to generate current residual values, wherein the generated current residual values describe the difference between expected values predicted by the system model and the series of current monitoring node values, and
      generate current residual-driven feature vectors based on the current residual values; and
   an abnormal detection platform having a memory and a computer processor adapted to:
      receive the current data-driven and residual-driven feature vectors, compare the current data-driven and residual-driven feature vectors with at least one decision boundary associated with an abnormal detection model, and transmit an abnormal alert signal based on a result of said comparison.

2. The system of claim 1, wherein the stochastic filter is associated with at least one of: (i) a Kalman filter, (ii) an extended Kalman filter, and (iii) an unscented Kalman filter.

3. The system of claim 1, wherein the system model is associated with at least one of: (i) a linear time invariant form, (ii) a linear time varying form, (iii) a linear parameter varying form, and (iv) a non-linear form.

4. The system of claim 1, wherein the current data-driven and residual-driven feature vectors undergo a feature augmentation process prior to being received by the abnormal detection platform.

5. The system of claim 1, wherein the at least one decision boundary and abnormal alert signal are associated with global feature vectors.

6. The system of claim 1, where sub-sets of the current data-driven feature vectors, current residual-driven feature vectors, and decision boundaries are associated with local feature vectors.

7. The system of claim 1, further comprising:
a normal space data source storing, for each of the plurality of monitoring nodes, a series of normal monitoring node values over time that represent normal operation of the cyber-physical system;
an abnormal space data source storing, for each of the plurality of monitoring nodes, a series of abnormal monitoring node values over time that represent abnormal operation of the cyber-physical system; and
a data-driven and residual features extraction computer platform having a memory and a computer processor adapted to:
receive the series normal monitoring node values and generate a set of normal feature vectors,
receive the series of abnormal monitoring node values and generate a set of abnormal feature vectors, and
automatically calculate and output the at least one decision boundary for the abnormal detection platform based on the set of normal feature vectors and the set of abnormal feature vectors.

8. The system of claim 7, wherein the at least one decision boundary is based at least in part on at least one residual-driven feature vector.

9. The system of claim 8, wherein the at one decision boundary is calculated without determining a threshold value for the at least one residual-driven feature vector.

10. A method for a system having a plurality of monitoring nodes each generating a series of current monitoring node values over time that represent current operation of a cyber-physical system, comprising:
receiving, by a data-driven features extraction computer platform, the series of current monitoring node values;
determining, by the data-driven features extraction computer platform, current data-driven feature vectors based on the series of current monitoring node values;
receiving, by a residual features extraction computer platform, the series of current monitoring node values;
executing, by the residual features extraction computer platform, a system model and utilize a stochastic filter together to generate current residual values, wherein the generated current residual values describe the difference between expected values predicted by the system model and the series of current monitoring node values;
determining, by the residual features extraction computer platform, current residual-driven feature vectors based on the current residual values;
receiving the current data-driven and residual-driven feature vectors at an abnormal detection platform;
comparing, by the abnormal detection platform, the current data-driven and residual-driven feature vectors with at least one decision boundary associated with an abnormal detection model; and
transmitting, by the abnormal detection platform, an abnormal alert signal based on a result of said comparison.

11. The method of claim 10, wherein the stochastic filter is associated with at least one of: (i) a Kalman filter, (ii) an extended Kalman filter, and (iii) an unscented Kalman filter.

12. The method of claim 10, wherein the system model is associated with at least one of: (i) a linear time invariant form, (ii) a linear time varying form, (iii) a linear parameter varying form, and (iv) a non-linear form.

13. The method of claim 10, wherein the current data-driven and residual-driven feature vectors undergo a feature augmentation process prior to being received by the abnormal detection platform.

14. The method of claim 10, wherein the at least one decision boundary and abnormal alert signal are associated with global feature vectors.

15. The method of claim 10, where sub-sets of the current data-driven feature vectors, current residual-driven feature vectors, and decision boundaries are associated with local feature vectors.

16. A non-transitory, computer-readable medium storing program code, the program code executable by a computer processor to cause the processor to perform a method for a system having a plurality of monitoring nodes each generating a series of current monitoring node values over time that represent current operation of a cyber-physical system, the method comprising:
receiving, by a data-driven features extraction computer platform, the series of current monitoring node values;
determining, by the data-driven features extraction computer platform, current data-driven feature vectors based on the series of current monitoring node values;
receiving, by a residual features extraction computer platform, the series of current monitoring node values;
executing, by the residual features extraction computer platform, a system model and utilize a stochastic filter together to generate current residual values, wherein the generated current residual values describe the difference between expected values predicted by the system model and the series of current monitoring node values;
determining, by the residual features extraction computer platform, current residual-driven feature vectors based on the current residual values;
receiving the current data-driven and residual-driven feature vectors at an abnormal detection platform;
comparing, by the abnormal detection platform, the current data-driven and residual-driven feature vectors with at least one decision boundary associated with an abnormal detection model; and
transmitting, by the abnormal detection platform, an abnormal alert signal based on a result of said comparison.

17. The medium of claim 16, wherein the stochastic filter is associated with at least one of: (i) a Kalman filter, (ii) an extended Kalman filter, and (iii) an unscented Kalman filter.

18. The medium of claim 16, wherein the system model is associated with at least one of: (i) a linear time invariant form, (ii) a linear time varying form, (iii) a linear parameter varying form, and (iv) a non-linear form.

19. The medium of claim 16, wherein the current data-driven and residual-driven feature vectors undergo a feature augmentation process prior to being received by the abnormal detection platform.

20. The medium of claim 16, wherein the at least one decision boundary and abnormal alert signal are associated with global feature vectors.

21. The medium of claim 16, where sub-sets of the current data-driven feature vectors, current residual-driven feature vectors, and decision boundaries are associated with local feature vectors.

\* \* \* \* \*